US007271766B2

(12) United States Patent
Zimmerman et al.

(10) Patent No.: US 7,271,766 B2
(45) Date of Patent: Sep. 18, 2007

(54) SATELLITE AND LOCAL SYSTEM POSITION DETERMINATION

(75) Inventors: Kurt R. Zimmerman, Mountain View, CA (US); H. Stewart Cobb, Palo Alto, CA (US); Paul Y. Montgomery, Menlo Park, CA (US); David G. Lawrence, Santa Clara, CA (US)

(73) Assignee: Novariant, Inc., Menlo Park, CA (US)

( * ) Notice: Subject to any disclaimer, the term of this patent is extended or adjusted under 35 U.S.C. 154(b) by 309 days.

(21) Appl. No.: 10/909,184

(22) Filed: Jul. 30, 2004

(65) Prior Publication Data

US 2007/0040744 A1 Feb. 22, 2007

(51) Int. Cl.
*G01S 3/02* (2006.01)
*G01S 1/00* (2006.01)

(52) U.S. Cl. ............ 342/464; 342/357.02; 342/357.14; 342/456; 342/463

(58) Field of Classification Search ........... 342/357.02, 342/357.06, 357.14, 450, 457, 463–464
See application file for complete search history.

(56) References Cited

U.S. PATENT DOCUMENTS

| | | | |
|---|---|---|---|
| 3,212,091 A * | 10/1965 | Bissett et al. | ............... 342/453 |
| 3,531,801 A | 9/1970 | Huebscher | |
| 3,641,576 A | 2/1972 | Farbanish | |
| 3,714,573 A | 1/1973 | Grossman | |
| 3,787,844 A | 1/1974 | Hastings et al. | |
| 4,008,479 A | 2/1977 | Smith | |
| 4,112,497 A | 9/1978 | Fletcher et al. | |

(Continued)

FOREIGN PATENT DOCUMENTS

JP 09181643 7/1997

(Continued)

OTHER PUBLICATIONS

G.M. Djuknic et al., Geolocation and Assisted-GPS. White Paper, Mobility: 3G-CDMA2000 & UMTS, Lucent Technologies, Bell Labs, May 31, 2002.*

(Continued)

*Primary Examiner*—Thomas H. Tarcza
*Assistant Examiner*—Fred H. Mull
(74) *Attorney, Agent, or Firm*—Brinks Hofer Gilson & Lione

(57) ABSTRACT

In a local positioning system, augmentation of the land-based system is provided by receiving signals from a GNSS. The signals from the land-based positioning system have a code phase accuracy better than one wavelength of a carrier of the signals from the GNSS. Different decorrelation may be used for signals from a satellite than from a land-based transmitter, such as using a digital decorrelator for signals from the satellite and an analog decorrelator for signals from a land-based transmitter. The receivers may include both a GNSS antenna and a local antenna. The phase centers of the two antennas are within one wavelength of the GNSS signals from each other. The local antenna is sized for operation in the X or ISM-bands of frequencies. The GNSS antenna is a patch antenna where the microwave antenna extends away from the patch antenna in at least one dimension.

19 Claims, 18 Drawing Sheets

U.S. PATENT DOCUMENTS

| | | |
|---|---|---|
| 4,314,251 A | 2/1982 | Raab |
| 4,426,712 A | 1/1984 | Gorski-Popied |
| 4,435,822 A | 3/1984 | Spencer et al. |
| 4,468,784 A | 8/1984 | Jagnow et al. |
| 4,468,793 A | 8/1984 | Johnson et al. |
| 4,485,383 A | 11/1984 | Maher |
| 4,613,977 A | 9/1986 | Wong et al. |
| 4,622,557 A | 11/1986 | Westerfield |
| 4,651,154 A | 3/1987 | Wong et al. |
| 4,728,955 A | 3/1988 | Hane |
| 4,728,958 A | 3/1988 | Choate |
| 4,754,465 A | 6/1988 | Trimble |
| 4,785,463 A | 11/1988 | Janc et al. |
| 4,847,862 A | 7/1989 | Braisted et al. |
| 5,079,562 A | 1/1992 | Yarsunas et al. |
| 5,148,452 A | 9/1992 | Kennedy et al. |
| 5,157,408 A * | 10/1992 | Wagner et al. ............... 342/399 |
| 5,216,611 A | 6/1993 | McElreath |
| 5,239,669 A | 8/1993 | Mason et al. |
| 5,293,170 A | 3/1994 | Lorenz et al. |
| 5,347,286 A | 9/1994 | Babitch |
| 5,384,574 A | 1/1995 | Counselman, III |
| 5,420,883 A | 5/1995 | Swensen et al. |
| 5,440,491 A | 8/1995 | Kwano et al. |
| 5,481,533 A | 1/1996 | Honig et al. |
| 5,523,761 A | 6/1996 | Gildea |
| 5,548,293 A | 8/1996 | Cohen |
| 5,572,218 A | 11/1996 | Cohen et al. |
| 5,576,715 A | 11/1996 | Litton et al. |
| 5,594,448 A | 1/1997 | D'Hont |
| 5,604,765 A | 2/1997 | Bruno et al. |
| 5,608,410 A | 3/1997 | Stilp et al. |
| 5,629,855 A | 5/1997 | Kyrtsos et al. |
| 5,646,630 A * | 7/1997 | Sheynblat et al. ..... 342/357.14 |
| 5,686,924 A | 11/1997 | Trimble et al. |
| 5,708,440 A | 1/1998 | Trimble et al. |
| 5,729,235 A | 3/1998 | Guthrie et al. |
| 5,749,549 A | 5/1998 | Ashjaee |
| 5,757,314 A | 5/1998 | Gounon et al. |
| 5,769,370 A | 6/1998 | Ashjaee |
| 5,786,773 A | 7/1998 | Murphy |
| 5,805,113 A | 9/1998 | Ogino et al. |
| 5,821,900 A | 10/1998 | Kishimoto |
| 5,848,060 A | 12/1998 | Dent |
| 5,859,611 A | 1/1999 | Lam et al. |
| 5,861,841 A | 1/1999 | Gildea et al. |
| 5,886,666 A | 3/1999 | Schellenberg et al. |
| 5,898,401 A * | 4/1999 | Walls .......................... 342/82 |
| 5,920,278 A | 7/1999 | Tyler et al. |
| 5,926,117 A | 7/1999 | Gunji et al. |
| 5,959,575 A | 9/1999 | Abbott |
| 5,963,180 A | 10/1999 | Leisten |
| 5,982,324 A * | 11/1999 | Watters et al. ......... 342/357.06 |
| 5,990,826 A | 11/1999 | Mitchell |
| 5,999,124 A * | 12/1999 | Sheynblat .............. 342/357.06 |
| 5,999,795 A | 12/1999 | Fowler et al. |
| 6,016,121 A | 1/2000 | Bogensberger et al. |
| 6,028,883 A | 2/2000 | Tiemann et al. |
| 6,031,487 A | 2/2000 | Mickelson |
| 6,052,647 A | 4/2000 | Parkinson et al. |
| 6,081,229 A | 6/2000 | Soliman et al. |
| 6,101,178 A | 8/2000 | Beal |
| 6,111,538 A | 8/2000 | Schuchman et al. |
| 6,182,011 B1 | 1/2001 | Ward |
| 6,188,353 B1 | 2/2001 | Mitchell |
| 6,198,439 B1 | 3/2001 | Dufrane |
| 6,236,365 B1 | 5/2001 | LeBlanc et al. |
| 6,243,587 B1 | 6/2001 | Dent et al. |
| 6,271,788 B1 | 8/2001 | Longaker et al. |
| 6,272,430 B1 | 8/2001 | Krasner |
| 6,278,407 B1 | 8/2001 | Ashjaee et al. |
| 6,289,280 B1 * | 9/2001 | Fernandez-Corbaton et al. 342/357.02 |
| 6,298,243 B1 | 10/2001 | Basil |
| 6,300,898 B1 | 10/2001 | Schneider et al. |
| 6,321,092 B1 * | 11/2001 | Fitch et al. ............... 455/456.5 |
| 6,330,274 B1 | 12/2001 | Uehara |
| 6,336,076 B1 | 1/2002 | Farley et al. |
| 6,353,412 B1 * | 3/2002 | Soliman ..................... 342/457 |
| 6,377,211 B1 | 4/2002 | Hsiung |
| 6,384,777 B1 | 5/2002 | McBurney et al. |
| 6,421,010 B1 | 7/2002 | Chadwick et al. |
| 6,430,503 B1 | 8/2002 | McBurney et al. |
| 6,449,558 B1 | 9/2002 | Small |
| 6,452,560 B2 | 9/2002 | KunysZ |
| 6,473,032 B1 | 10/2002 | Trimble |
| 6,473,033 B1 | 10/2002 | Trimble |
| 6,535,503 B1 | 3/2003 | Toskala et al. |
| 6,538,609 B2 | 3/2003 | Nguyen et al. |
| 6,542,821 B2 | 4/2003 | Krasner |
| 6,556,942 B1 * | 4/2003 | Smith ......................... 342/450 |
| 6,590,524 B1 | 7/2003 | Farley et al. |
| 6,650,649 B1 | 11/2003 | Muhammad et al. |
| 6,665,333 B2 | 12/2003 | McCrady et al. |
| 6,677,895 B1 | 1/2004 | Holt |
| 6,731,242 B1 | 5/2004 | Rapeli |
| 6,753,810 B1 * | 6/2004 | Yang et al. ............ 342/357.14 |
| 6,784,826 B2 | 8/2004 | Kane et al. |
| 6,999,716 B1 * | 2/2006 | Andre et al. ................ 455/3.02 |
| 2001/0004601 A1 | 6/2001 | Drane et al. |
| 2002/0145565 A1 * | 10/2002 | Rabinowitz et al. ......... 342/464 |
| 2002/0193941 A1 | 12/2002 | Jaeckle et al. |
| 2003/0058163 A1 * | 3/2003 | Zimmerman et al. ....... 342/464 |
| 2003/0071639 A1 | 4/2003 | Haag et al. |
| 2003/0132880 A1 | 7/2003 | Hintz |
| 2003/0181161 A1 * | 9/2003 | Harles et al. .............. 455/12.1 |
| 2004/0171388 A1 | 9/2004 | Couronne et al. |
| 2004/0235485 A1 | 11/2004 | Tanaka |
| 2005/0105951 A1 | 5/2005 | Risheq |
| 2005/0280598 A1 | 12/2005 | Webb et al. |
| 2006/0014545 A1 | 1/2006 | Mo et al. |

FOREIGN PATENT DOCUMENTS

WO  PCT WO 99/63358  12/1999

OTHER PUBLICATIONS

M. Birchler, E911 Phase 2 Location Solution Landscape. FCC Location Round Table, Wireless Access Technology Research, Motorola Labs, Jun. 28, 1999.*

M.D. Hahm et al, Analog vs. digital: a comparison of circuit implementations for low-power matched filters, IEEE International Symposium on Circuits and Systems, vol. 4, p. 280-283, May 1996.*

M. Neitola et al, An analog correlator for a WCDMA receiver, IEEE International Symposium on Circuits and Systems, vol. 4, p. 753-756, May 2000.*

M.A.R. Eltokhy et al, A 3.4-mW 128-MHz analog correlator for DS-CDMA wireless applications, IEEE International Symposium on Circuits and Systems, vol. 5, p. 377-380, May 2002.*

J. Ashjaee, "GPS Doppler processing for precise positioning in dynamic applications", Navigation, vol. 32 (4), p. 370-385, 1986.

J.C. Camparo, et al., "Precise Time Synchronization of Two Milstar Communications Satellites Without Ground Intervention", International Journal of Satellite Communications, vol. 15, p. 135-139, 1997.

GSM Spectrum Allocation, GSM World, http://www.gsmworld.com/using/spectrum/frequencies.shtml , unknown.

G.M. Djuknic, et al., "Geolocation and Assisted-GPS", White Paper, Mobility: 3G-CDMA2000 & UMTS, Lucent Technologies, Bell Labs, May 31, 2002.

M. Birchler, "E911 Phase 2 Location Solution Landscape", FCC Location Round Table, Wireless Access Technology Research, Motorola Labs, Jun. 28, 1999.

SearchMoblieComputing.com Definition for Specialized Mobile Radio, http://searchmobilecomputing.techtarget.com/sDefinition/0,,sid40_gci499515,00.html, Apr. 2003.

Privateline.com: Digital Wireless Basics, http://www.privateline.com/PCS/Frequencies.htm , unknown.

IEEE standard letter designations for radar-frequency bands, IEEE Std. 521-1984, Nov. 1984.

NavTalk Cellular Phone/GPS Receiver: Owners Manuarl and Reference Guide. Garmin Corporation, p. 28, 104, Jan. 2000.

Stone and Powell, "Carrier Phase Integer Ambiguity Resolution Using Dual Frequency Pseudolites", ION conference paper, Sep. 17, 1998.

Cobb, H. Stewart, "GPS Pseudolites: Theory, Design, and Applications", PhD dissertation, Stanford University, Dec. 1997.

Hatch, *GPS World* Magazine, May 1996, The Promise of a Third Frequency.

Han and Rizos, "The Impact of Two Additional Civilian GPS Frequencies on Ambiguity Resolution Strategies", ION conference paper, Jun. 28-30, 1999.

Zimmerman, "Experiments in the Use of the Global Positioning System for Space Vehicle Rendezvous", PhD dissertation, Dec. 1996.

IntegriNautics IN200 Users Manual, Sep. 9, 1999.

IntegriNautics IN300 Users Manual, Jan. 2000.

IntegriNautics IN400 Users Manual, Aug. 31, 2001.

IntegriNautics IN500 Users Manual, May 10, 2000.

Stone et al., "GPS Pseudolite Transceivers and their Applications"; ION conference paper, Jan. 25-27, 1999.

D.M. Pozar et al. "A Dual-Band Circularly Plarized Aperture Coupled Stocked Microstrip Antenna for GPS," IEEE Trans.Antennas and Propagation, vol. 45, pp. 1416-1625, Nov. 1997.

Johnson, Richard C., "Antenna Engineering Handbook—Third Edition," pp. 13-18 through 13-24; dated 1993.

S.W. Smith, The Scientist and Engineers' Guide to Digital Signal Processing, $2^{nd}$ Edition, California Technical Publishing, pp. 307-308, 1999.

D. Lamensdorf, et al., "Dual-band quadrifilar helix antenna", IEEE Antennas and Propagation Society International Symposium, vol. 3, pp. 488-491, Jun. 2002.

* cited by examiner

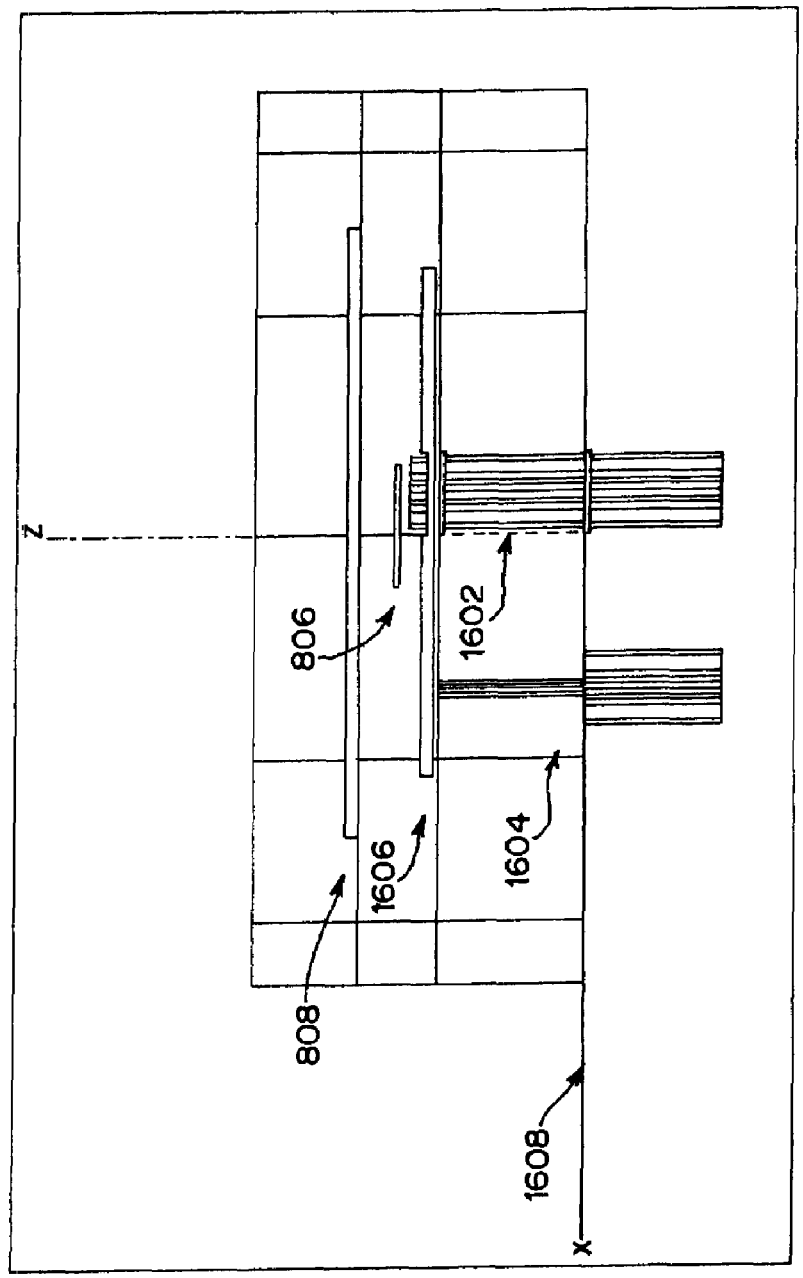

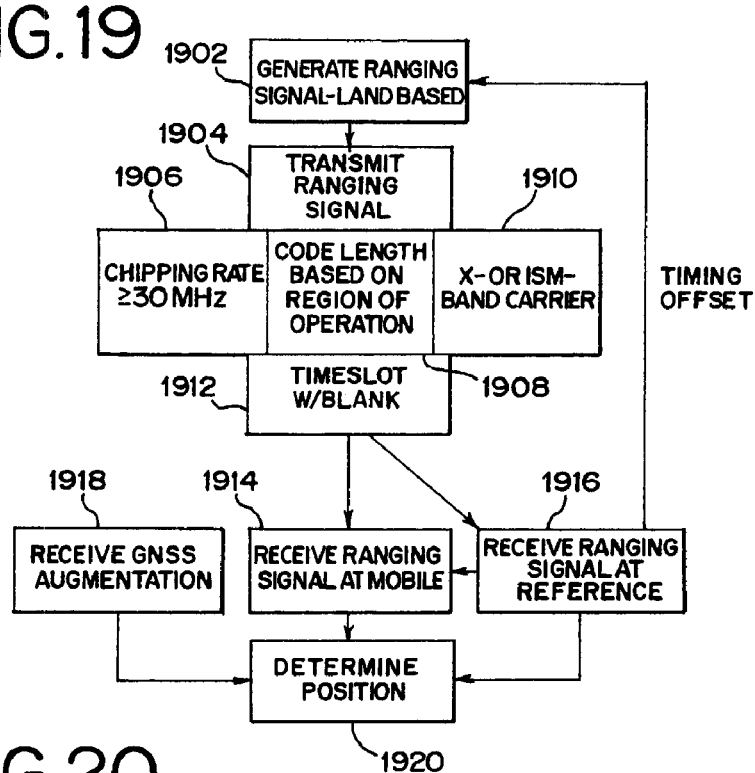
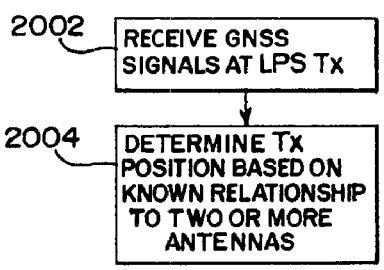
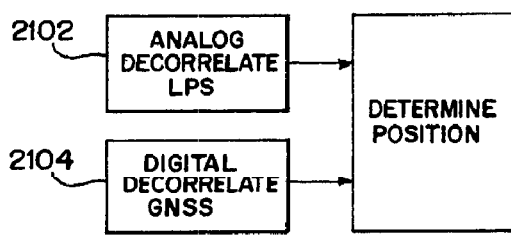
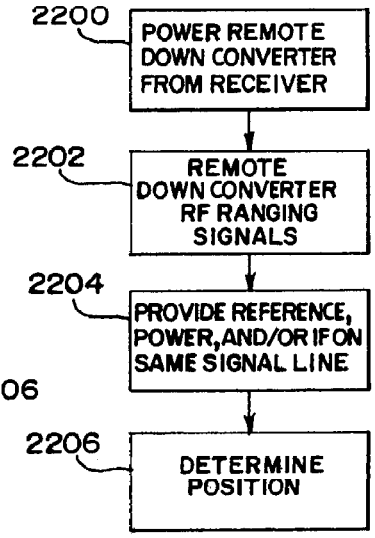

SATELLITE AND LOCAL SYSTEM POSITION DETERMINATION

BACKGROUND

The present invention relates to range or position determination. In particular, signal structures, transmitters, receivers, other components and/or methods of operation of a ranging or positioning system are provided.

Global navigation satellite systems (GNSS) allow a receiver to determine a position from ranging signals received from a plurality of satellites. Different GNSS systems are available or have been proposed, such as the global positioning system (GPS), Gallileo or GLONASS. The GPS has both civilian and military applications. Different ranging signals are used for the two different applications, allowing for different accuracies in position determination.

Position is determined from code and/or carrier phase information. A code division multiple access code is transmitted from each of the satellites of the global positioning system. The spread spectrum code is provided at a 1 MHz modulation rate for civilian applications and a 10 MHz modulation rate for military applications. The code provided on the L1 carrier wave for civilian use is about 300 kilometers long. The codes from different satellites are correlated with replica codes to determine ranges to different satellites. Using civilian code phase information, an accuracy of around one or two meters may be determined. Centimeter level accuracy may be determined using real-time kinematic processing of carrier phase information. A change in position of the satellites over time allows resolution of carrier phase ambiguity.

In addition to satellite based systems, land-based transmitters may be used for determining a range or position. Land based transmitters may include pseudolites. Pseudolite systems have been proposed for landing aircraft and determining a position of a cellular telephone. Pseudolites typically use GPS style signals or codes. For example, a GPS spectrum code is transmitted on a same or different carrier frequency as used for GPS. Code division multiple access (CDMA) may be over-laid with time division multiple access (TDMA) methods to increase a dynamic range of the GPS style coded signals. Some pseudolites systems are arranged for use with GNSS. As a result of using GNSS types of signals, psuedolite systems may be limited to several meters of accuracy based on code phase measurements.

BRIEF SUMMARY

The present invention is defined by the following claims, and nothing in this section should be taken as a limitation on those claims. By way of introduction, the preferred embodiments described below include methods and systems for a land-based range or position determination. To provide sub-meter accuracy, ranging signals with a high modulation rate of code, such as 30 MHz or more, are transmitted. Code phase measurements may be used to obtain the accuracy without requiring relative motion or real time kinematic processing to resolve any carrier cycle ambiguity. The ISM bands or X-band is used for the carrier of the code to provide sufficient bandwidth within available spectrums. The length of codes used is at least about a longest length across the region of operation, yet less than an order of magnitude longer, such as about 15 kilometers in an open pit mine, but other lengths may be used. The spread spectrum codes from different land-based transmitters are transmitted in time slots pursuant to a time division multiple access scheme for an increase in dynamic range. The dynamic range is a range of power over which a receiver can track a signal, to distinguish from "range" as in distance measurement. To avoid overlapping of code from different transmitters, each time slot includes or is separated by a blanking period. The blanking period is selected to allow the transmitted signal to traverse a region of operation without overlap with a signal transmitted in a subsequent time slot by a different transmitter. Differential measurements of signals received at a base station and a mobile receiver may allow for improved accuracy. Any one or more of the signal structure characteristics summarized above may be used independently or in combination with other signal characteristics in a land-based transmitter system.

In addition to or for use independently of the signal structure characteristics discussed above, the land-based transmitters include free running oscillators or oscillators free of clock synchronization with any remote oscillator. A reference receiver receives the ranging signals from different transmitters and generates timing offset information, such as code phase measurements. The timing offset information is then communicated back to transmitters. The temporal offset information indicates relative timing or phasing of the different transmitted ranging signals to the reference receiver. The transmitters then transmit the temporal offset information with the ranging signals, such as modulating the transmitted code by the timing offset information. A mobile receiver is operable to receive the ranging signals and timing offset information in a same communications path, such as on a same carrier. Alternatively, the timing offset information is communicated from the reference directly to the mobile. A system with oscillators that are synchronized with GNSS or any other synchronization source may be used. Position is determined with the temporal offset information and the ranging signals. The temporal offset information for the various transmitters allows the mobile receiver to more accurately determine position than in an unsynchronized system. Various aspects of the synchronization of the system discussed above may be used independently of each other or in combination.

In addition to or for use independent from the above described synchronization and signal characteristics, other features are provided in a land-based ranging system. For example, augmentation of the land-based system is provided by receiving signals from a GNSS. The signals from the land-based positioning system have code phase accuracy better than one wavelength of a carrier of the signals from the GNSS. Different decorrelation may be used for signals from a satellite than from a land-based transmitter, such as using a digital decorrelator for signals from the satellite and an analog decorrelator for signals from a land-based transmitter. The receivers may include both a GNSS antenna and a higher frequency microwave antenna, also referred to as a local antenna. The term "microwave" is used here to include frequencies from about 900 MHz to 300 GHz. The phase centers of the two antennas are within one wavelength of the GNSS signals from each other. The microwave antenna is sized for operation in the X or ISM-bands of frequencies. The GNSS antenna is a patch antenna where the microwave antenna may extend away from the patch antenna in at least one dimension. Any of the various characteristics of an augmented GNSS and land-based ranging system may be used independently or in combination.

In addition to or for use independent of the signal characteristics, synchronization characteristics or augmentation characteristics discussed above, a receiver is adapted for receiving signals from a land-based transmitter. The receiver includes an analog decorrelator for decorrelating the transmitted spread spectrum signals. A down converter connected with an antenna may be spaced away from other portions of the receiver. The down converter down converts received ranging signals and provides them to the remotely spaced receiver portions. A signal line connecting the down converter to the receiver may be operable to transmit any two or more of a reference signal provided to the down converter, the down converted intermediate frequency signals provided to the receiver, and power provided to the down converter. The receiver may be positioned adjacent to or as part of a land-based transmitter. By determining positions of two or more antennas, the location of the associated transmitter is determined. Any of the various receiver characteristics described above may be used independently or in combination.

In a first aspect, a method is provided for determining a position from transmitted signals. At least one range is measured from signals for a GNSS system. At least another range is measured from signals for a local positioning system. A position is determined from the measured ranges. The signals of the local positioning system, as measured by a receiver, have code phase range accuracy better than one wavelength of a carrier of the signals from the GNSS system.

In a second aspect, a system is provided for determining a position from transmitted signals. A GNSS receiver is operable to measure at least one range from signals from a satellite. A local positioning system receiver is operable to measure another range from signals from a land-based transmitter. The signals from the land-based transmitter, when measured by a receiver, have code phase range accuracy better than one wavelength of a carrier of the signals from the GNSS system. A processor is operable to determine a position from the measurements of the GNSS receiver and the local positioning system receiver.

In a third aspect, a system is provided for determining a position from transmitted signals. A digital decorrelator is operable to decorrelate signals from a satellite. An analog decorrelator is operable to decorrelate signals from a land-based transmitter. A processor is operable to determine a position as a function of the digital and analog decorrelated signals.

In a fourth aspect, a method is provided for determining a position from transmitter signals. Signals from a satellite are decorrelated in a digital domain. Signals from a land-based transmitter are decorrelated in an analog domain. A position is determined as a function of the decorrelated signals.

Further aspects and advantages of the invention are discussed below in conjunction with the preferred embodiments. The further aspects and advantages may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 19 is a flow chart diagram of one embodiment of a method for determining range information in a local positioning system;

FIG. 20 is a flow chart diagram of one embodiment for determining a position of a transmitter;

FIG. 21 is a flow chart diagram of one embodiment for decorrelation to determine a position; and FIG. 22 is a flow chart diagram of one embodiment of a method for remote down conversion of received local positioning system ranging signals.

DETAILED DESCRIPTION OF THE DRAWINGS AND PRESENTLY PREFERRED EMBODIMENTS

Figure 1:
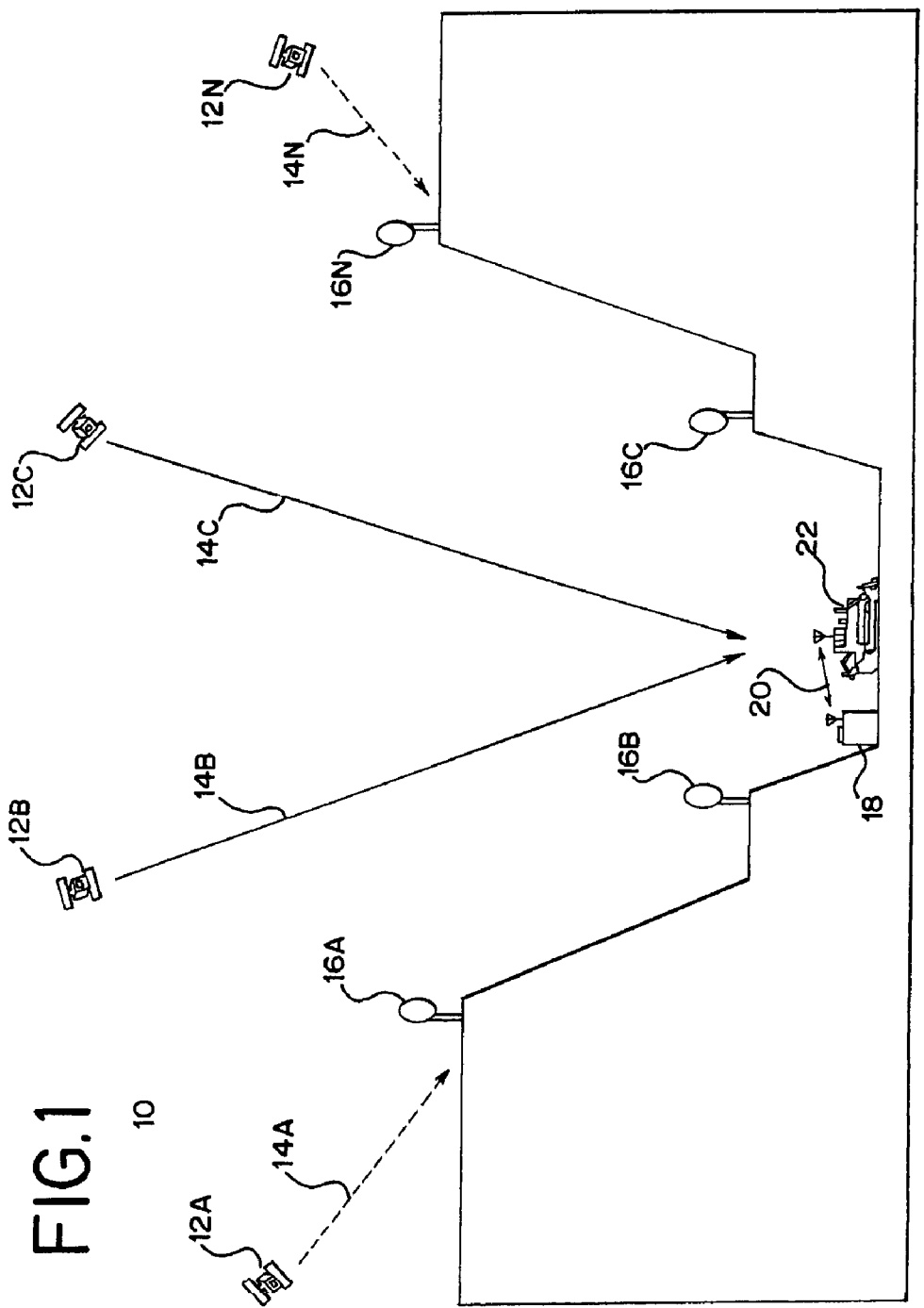
FIG. 1 is a graphical representation of one embodiment of a local positioning system with GNSS augmentation in an open pit mine.

GNSS relies on access to a plurality of satellites at any given location on the globe. For example, access to at least five satellites allows for position solution with carrier phase based centimeter accuracy. Some locations lack sufficient access to satellites. For example, FIG. 1 shows a system 10 with a plurality of satellites 12A-N relative to an open pit mine. A reference station 18 and mobile receiver 22 have lines of sight 14B, 14C to two satellites 12B, 12C but the walls of the mine block access to signals from other satellites 12A, 12N. In order to provide accurate positioning, a plurality of land-based transmitters 16A-N are positioned within, encircling, around, or combination thereof the mine.

The land-based transmitters 16, reference station 18 and/or mobile receiver 22 are a local positioning system. The local positioning system is operable without the satellites 12, but may be augmented with the satellites 12. Additional, different or fewer components may be provided, such as providing a greater or less number of land-based transmitters 16. As another example, the local positioning system may use a mobile receiver 22 without a reference station 18. A receiver may use signals from the local positioning system to determine a position or range. For example, the range from any one or more of the land-based transmitters 16 to either the reference station or the mobile receiver 22 is determined. A position may be determined from a plurality of ranges to other land-based transmitters 16. Using the reference station 18, additional accuracy in determining the position of the mobile receiver may be provided.

The land-based transmitters 16 are positioned at any of various locations within or around the mine. The land-based transmitters 16 include transmitters on poles, towers, directly on the ground, on stands, or other locations where the transmitter is maintained in a substantially same position relative to the ground. The land-based transmitters 16 are positioned such that most or all locations in the mine have line-of-sight access to four or more land-based transmitters 16. Access to a fewer number of transmitters may be provided.

Figure 5:
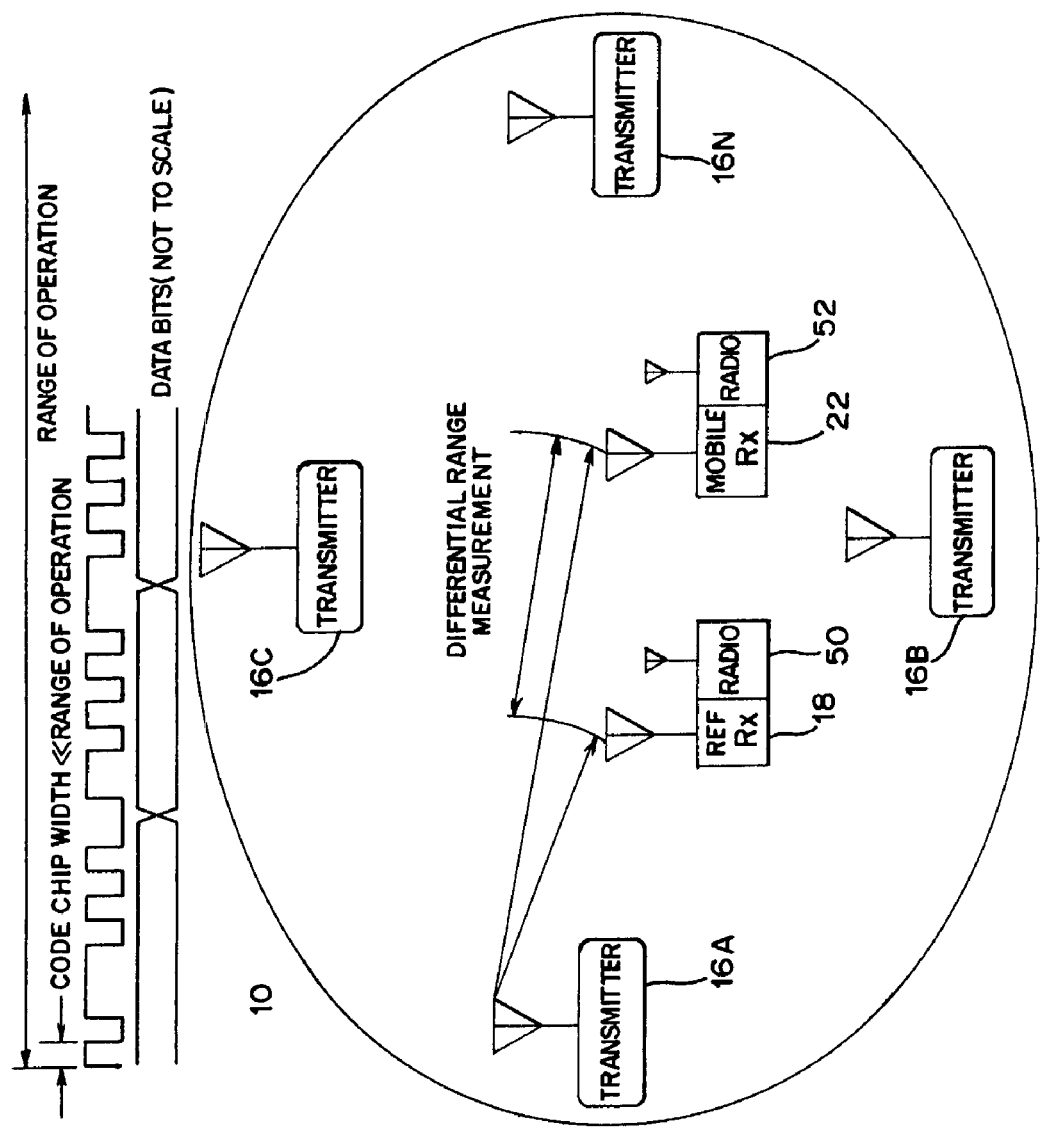
FIG. 5 is a graphical representation of the distribution of local transmitters and receivers for differential positioning in one embodiment.

The mobile receiver 22 is positioned on a piece of equipment, such as a truck, crane, excavator, vehicle, stand, wall or other mobile or possibly moving piece of equipment or structure. The reference station 18 is a land-based receiver, such as a receiver on a pole, tower, stand, directly on the ground or other position maintained in a substantially same location relative to the ground. While the reference station 18 is shown separate from the land-based transmitter 16, the reference station may be located with one or more of the land-based transmitter 16. More than one reference station 18 may be used. Both of the reference station 18 and mobile receiver 22, are operable to receive transmitted ranging signals from at least one of the land-based transmitters 16. FIG. 5 shows a top view of FIG. 1. As shown in FIGS. 1 and 5, a differential solution technique may be used. The ranging signals from one or more of the land-based transmitters 16 or other transmitters are received by both the reference station 18 and the mobile receiver 20. By communicating information on link 20 from the reference station 18 to the mobile receiver 22, additional accuracy in determining a position may be provided.

The local positioning system uses GNSS, such as GPS, ranging signals for determining the position of the mobile receiver. For example, the ranging signal is transmitted at the L1, L2, or L5 frequencies with a direct-sequence, spread spectrum code having a modulation rate of 10 MHz or less. A single cycle of the L1 frequency is about 20 centimeters in length, and a single chip of the spread spectrum code modulated on the carrier signal is about 300 meters in length. The code length is about 300 kilometers. The transmitters 16 continuously transmit the code division multiple access codes for reception by the receivers 18, 22. In the absence of movement by the mobile receiver 22, integer ambiguity of the carrier phase may be unresolved. As a result, code based accuracy less accurate than a meter is provided using GPS signals. Given movement of the mobile receiver 22, carrier phase ambiguity may be resolved to provide sub-meter or centimeter level accuracy.

Figure 2:
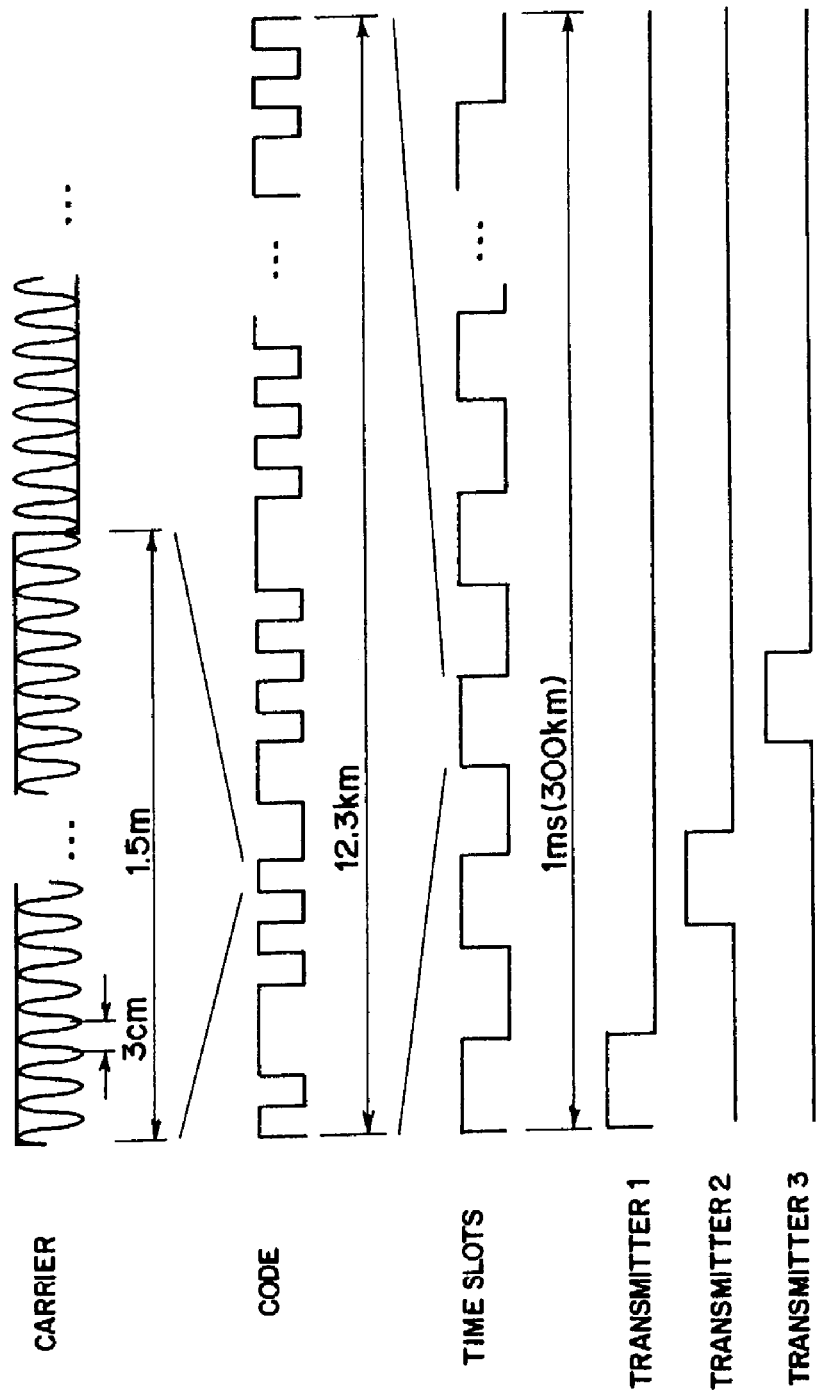
FIG. 2 is a graphical representation of one embodiment of characteristics of a code and carrier of radio frequency ranging signals.

In an alternative embodiment, different ranging signals are used by the local positioning system. FIG. 2 shows one embodiment of a ranging signal. The carrier wave of the ranging signal is in the X or ISM-bands. The X-band is generally designated as 8,600 to 12,500 MHz, with a band from 9,500 to 10,000 MHz or other band designated for land mobile radiolocation, providing a 500 MHz or other bandwidth for a local transmitter. In one embodiment, the carrier frequency is about 9750 MHz, providing a 3 centimeter wavelength. The ISM-bands include industrial, scientific and medical bands at different frequency ranges, such as 902-928 MHz, 2400-2483.5 MHz and 5725-5850 MHz. The frequency and the bandwidth may be limited by government regulatory constraints. Other factors that affect the frequency and bandwidth include signal propagation properties. Different frequency bands for the carrier wave may be used, such as any microwave frequencies, ultra wide band frequencies, GNSS frequencies or other RF frequencies.

The ranging signals have a Direct-Sequence Spread Spectrum (DSSS) code. For example, a direct sequence code such as a Maximal Length Linear Finite Shift Register (MLFSR), a Gold or other pseudo-random noise (PN) code is provided. Other codes may be used. The code is modulated with a carrier at a modulation rate. For DSSS codes, the modulation rate is called the chipping rate. The modulation rate of the code is at least 30 MHz, at least 60 MHz, at least three times a GNSS modulation rate or other modulation rate. Given high bandwidth available at the chosen carrier frequency, greater or lesser modulation rates may be provided, such as 200 MHz. In one embodiment, the modulation rate is less than 250 MHz. Greater modulation rates may be used, such as rates categorized under Ultra Wide Band regulation. Given a 200 MHz modulation rate of the code, the width of each chip is 1.5 meters. In yet another alternative embodiment, a modulation rate of the code less than 30 MHz, such as 10 MHz or fewer, is used. The modulation rate is the same for each of the transmitters. The code used by each transmitter may be the same or different. In alternative embodiments, the modulation rate may also be different or the same for different transmitters.

The accuracy of the system to a first order is proportional to the code modulation rate. The rate is provided as high as possible to meet the desired accuracy but bounded by the available bandwidth, carrier frequency, hardware and other constraints. The modulation rate must be below or equal to the carrier frequency. In one embodiment, the nominal modulation rate is set to half of the available bandwidth, but may be greater and filtered to meet constraints of the available bandwidth, or lesser. The high bandwidth or modulation rate of the code may provide code based accuracy for range or position less than one wavelength of an L1 or L2 GPS frequencies. The accuracy of a signal is the accuracy of a measurement of the signal made by a receiver. The accuracy is sub-meter, such as being better than 19 or 24 centimeters. In one embodiment, the code-based range accuracy is better than 4 centimeters. In one method, accuracy is calculated with RMS code tracking errors. The RMS code tracking error for a single land-based transmitter 16 is computed from the radio navigation signal power present at the input terminals of a receiver. The ranging signal in one example is a pseudo random Binary Phase Shift Key (BPSK) signal centered at 9,750 MHz with a modulation rate of 30 million chips per second, so that the length of one chip in space is about 10 meters, and a peak transmit power of 1 Watt. The ranging signal is pulsed on and off in a duty cycle of 4 percent. A plus 10 dBIC gain Right Hand Circularly Polarized (RHCP) transmit antenna and a 0 dB gain RHCP receive antenna are assumed. The propagation environment is assumed to be free space with a maximum distance of 15 kilometers. Using a Friis transmission formula, the power available to the receiver is −110 dBm. The RMS code tracking jitter with the input power level of −110 dBm is computed. X-band receiver noise is assumed to be about 4 dB, resulting in a −170 dBm/Hz of the thermal noise power at the receiver input. The Delay Lock Loop (DLL) loop bandwidth is assumed to be 10 Hz, the predetection integration time is assumed to be 40 microseconds, the correlator chip spacing is assumed to be one chip, and no carrier smoothing is implemented. The RMS code tracking error resulting from these assumptions is 3.2 centimeters, or about 1/300 of the length of a single code chip. This fraction (1/300 of a single code chip) is one way to quantify the accuracy of a code signal. The 3.2 centimeters provides the 1-standard-deviation (1-Sigma) error on range for one transmitter 16. Accuracy is provided for 1-standard-deviation or better, such as 2- or 3-standard-deviations (e.g. 2-Sigma, 3-Sigma), but not worse, such as less than 1-standard-deviation. To estimate accuracy for a three-dimensional position solution, the 1-Sigma error is multiplied by the Dilution of Precision (DOP). Assuming a worst case DOP of 4.0, a 1-Sigma position error of 12.8 centimeters is provided. 12.8 centimeters is well within one wavelength of a GPS carrier. Better than 12 cm position accuracy may be provided. The accuracy was calculated above based on a number of assumptions and a particular ranging signal. Other ranging signals may be used with the same or different accuracy and using different assumptions. Using only a code phase measurement of the ranging signals shown in FIG. 2, centimeter level or sub-meter level position accuracy may be provided. When computed for a modulation rate of 200 MHz with the same assumptions, about 8.6 millimeters code phase accuracy is provided.

Accuracy may be improved by providing differential measurements of the ranging signals, particularly in the case of transmitters free of synchronization. For example, the reference station 18 and the mobile receiver 22 both measure a same ranging signal transmitted by a same land-based transmitter 16. The differential between phase measurements performed by the reference station 18 and the mobile receiver 22 systematically removes the unknown clock of the transmitter, as well as other common mode errors possibly including cable and receiver circuitry biases, and results in one unknown time difference between the reference and mobile receivers. Additional differential phase measurements from additional transmitters have the same one unknown time difference between the reference and mobile receivers. The fewer unknown variables and reduced common mode errors due to differential phase measurements results in improved accuracy of the mobile receiver relative to the reference. Accuracy may be further improved by placing the transmitter in a location relative to other transmitters (and satellites) that improves the dilution of precision (DOP). Generally, DOP is improved by placement in a region most orthogonal to other transmitters/satellites, as viewed from the receiver.

The ranging signals are further characterized by the length of the code. The local positioning system is operated within a region. The chip width and code length are set as a function of a longest dimension over which a ranging signal from a particular land-based transmitter 16 will traverse within the region of operation. In one embodiment, the chip width in space is much shorter than up to approximately equal to the longest dimension of the region of operation. The chip width of the code is directly related to the modulation rate by the speed of light. Therefore, selecting the chip width according to the region of operation is an alternative way to select a minimum modulation rate. In the embodiment shown in FIG. 2, the chip width is 1.5 meters, less than ten meters, or another value much less than the longest dimension of a likely region of operation.

In one embodiment, the code length in space is approximately equal to or slightly longer than a longest dimension of the region of operation. In another embodiment, the code length may be shorter. The code length in bits is equal to the modulation rate times the code length in space divided by the speed of light. Most easily generated codes have lengths close to powers of 2. For example, an N-bit MLFSR or Gold code register generates a code $(2^N)-1$ bits long. Given a desired initial code length in space and initial modulation rate, the nearest available code length in bits that is a power of two may be chosen. The code length in space or the modulation rate or both are adjusted accordingly. "Approximately equal" may include shorter code lengths than the region of operation. The code length in bits is calculated from the desired length and chip rate, and then adjusted to the next highest power of 2. The code length in space is then recalculated to provide the code length used. For example, the longest dimension of the region of operation is 10 kilometers in an open pit mine. The length of a 10 km code in bits at a 200 MHz chip rate is 10 km * 200 MHz divided by the speed of light, which results in 6667 bits. The nearest easily generated code is 8191 bits long, so the code length in space is lengthened to 12.3 km. A lesser or greater code length may be provided for a 10 kilometer region of operation. Other code lengths may be used for the same sized or other sized regions of operation.

The length of code ensures that each measured code phase defines a unique range within the region of operation. A set of four measured code phases define a unique three-dimensional position and time within the region. The region of operation is the open pit mine or the region of the open pit mine associated with line of sight from a particular land-based transmitter 16. The region of operation may be the same or different for each land-based transmitter 16.

The local positioning system may have a code length set in common for any of a number of different uses. Alternatively, the code length is programmable to be configured depending on the different use or relative size of a region of operation for a given use.

As shown in FIG. 2, another possible characteristic of the ranging signal for each given transmitter is that the ranging signal is transmitted in a time slot. The Direct-Sequence Spread Spectrum (DSSS) code is turned on and off periodically pursuant to a time division multiple access scheme. The DSSS code is a ranging code, or more concisely here, a "code." Time division multiple access for the local positioning system increases the dynamic range. The number of time slots corresponds to the number of transmitters 16. The length and number of the time slots set the repeat period for each transmitter 16. The repeat period may be set based on the mobile user dynamics. The mobile receiver 22 makes range measurements and calculates position from the range measurements. The maximum acceleration and velocities of the mobile receiver 22 within the region of operation are taken into account by setting the repeat period. For faster moving mobile receivers 22, the local positioning system makes more rapid measurements over a shorter repeat period. A new measurement may be made each time the transmitted code is repeated. For faster mobile user dynamics, shorter repeat periods of the code are provided. For civilian GPS code, a repeat period of one millisecond is used. The fastest possible range measurement update is 1 KHz with a typical position measurement update of 10 Hertz or every 100 milliseconds. Update rates and repeat periods may be slower for users that move slower but desire greater accuracy. For example, tracking earth movement and deformation modeling or earthquake prediction may use much greater repeat periods, but update rates may be faster for faster moving mobile receivers, such as race cars on a track. Various methods may be used to predict the user dynamics to allow for longer repeat period. A nominal setting for the repeat period provides 100 times the bandwidth of the user dynamics. Other weighting values than 100 may be used, such as greater or lesser values. In the open pit mining embodiment, one millisecond repeat period is used, but other repeat periods may be provided.

The number of time slots available to the local positioning system is equal to the repeat period times the speed of light divided by the code length in space. Using time division multiple access, only one transmitted signal is desired to be present in the operating space for any given location at a given time. A ranging signal with a code length approximately equal to the size of the operating space is transmitted in one time slot. An additional time slot or a longer time slot period is provided to allow the transmitted ranging signal to traverse the operating space. This blank period is about as long a code length in space, but may be longer or shorter. Each transmitter 16 transmits in a different time slot with an associated blanking period. Given the code length and corresponding blanking period, the transmitter capacity is equal to half the number of time slots calculated as discussed above. The desired transmitter capacity may include 4, 10, 100 or other numbers of transmitters. Through iteration, ranging signals with the desired capabilities may be provided for various types of operation.

The ranging signal transmitted in each of the time slots is synchronized to within at least three microseconds of other ranging signals, but longer or shorter time periods may be used. Using the open pit mine example discussed above, 12 time slots are available where each time slot is twice the length of the code. The time slot includes a period for transmission of the code and a subsequent blanking period. The transmitted code is aligned to the beginning of the time slot and the time slot is maintained to a global time to better than a few microseconds, such as synchronized to within at least 3 microseconds. The slot timing accuracy is provided from received GPS signals, a radio pulse, a common cable connected between different components, cable modem connections between different components, programmed clock settings, combinations thereof or other mechanisms for generally aligning time slots. In one embodiment, the timeslots are arbitrarily selected and fixed per transmitter. In another embodiment, a user may remotely configure the transmitter timeslot. In yet another embodiment, a transmitter may have a sensor to detect energy transmitted by other transmitters, and dynamically select an empty timeslot.

Figure 3:
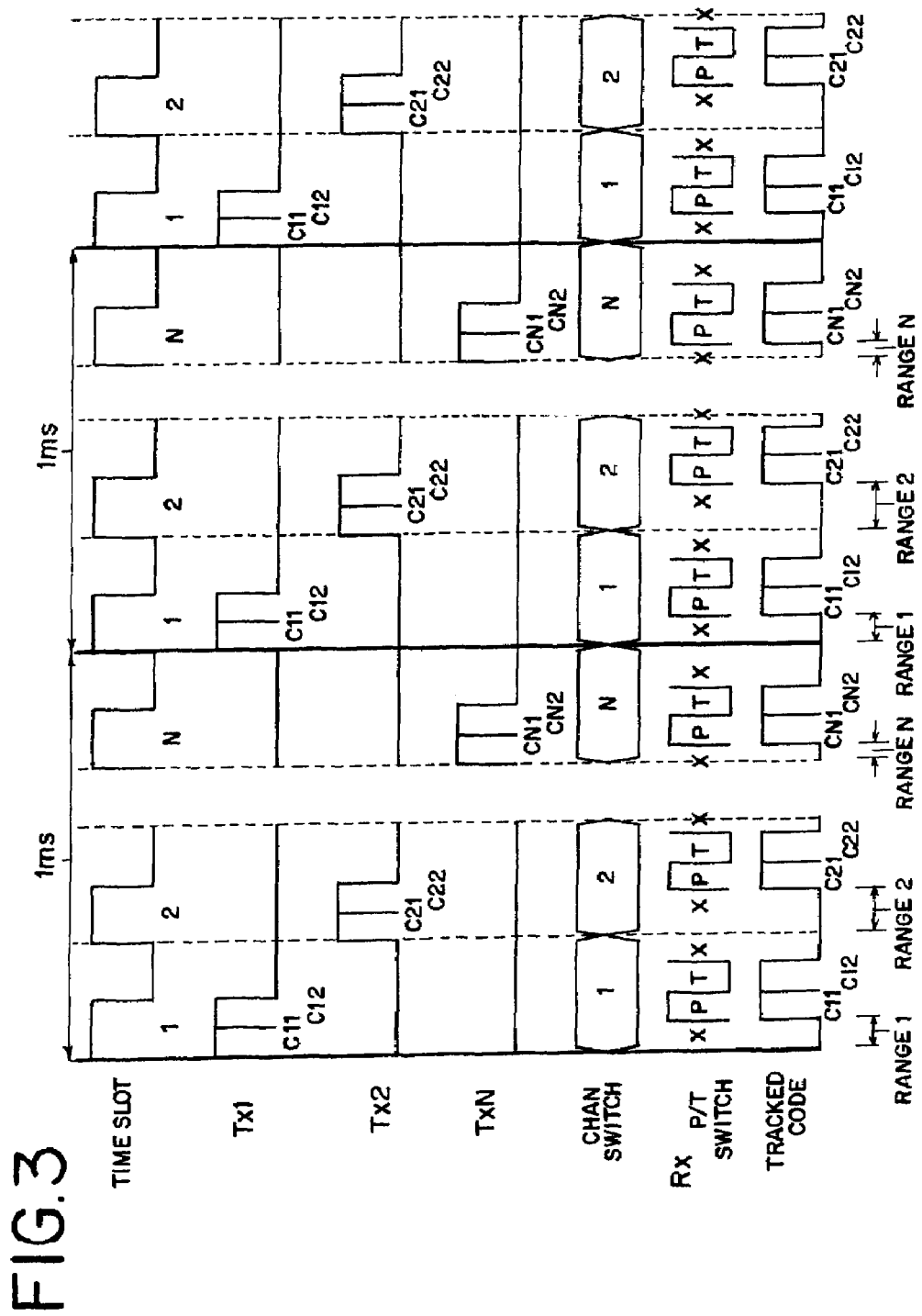
FIG. 3 is a graphical representation of time division multiple access transmissions used in a local positioning system of one embodiment.

FIG. 3 shows one representation of the TDMA/DSSS ranging signals transmission and reception scheme. Multiple DSSS signals are transmitted in unique TDMA time slots. Each transmitter transmits two unique DSSS codes or two instances of the same code, designated C11 and C12 for transmitter 1, C21 and C22 for transmitter 2 and so on. The codes from any one transmitter may be different to enable a receiver 18, 22 to easily distinguish between a time period to accumulate the detection measurements and another time period to accumulate tracking measurements.

The process of tracking a DSSS signal in TDMA uses two control signals, a detection signal for detecting correlation power between an incoming signal and an internally generated replica, and a tracking signal for feedback in a delay lock loop control scheme. The tracking signal is generated by correlating the incoming signal with an internally generated early-minus-late replica. One transmitter transmits two codes in immediate succession, such as two codes taking a total time of about 41 microseconds. A blank period of similar length follows the transmission of the ranging signal. A different transmitter subsequently transmits two codes in immediate succession, with the process repeating for all transmitters and each of the different time slots. Within the mobile receiver 22, channels are switched between different internally generated digital codes to control which code is sent to a mixer. Another switch prior to the channel switch switches between detection and tracking signals. When the receiver tracks a transmitter code, the internally generated replica of the code is delayed by a period of time that corresponds to the range of the receiver 18, 22 from the transmitter 16. The receiver's internally generated C11 detection and C12 tracking codes are shown in FIG. 3 for tracking the ranging signals transmitted by the first transmitter 16, delayed by the time of flight over the range from the first transmitter 16 to the mobile receiver 22. In the second time slot, the mobile receiver 22 internally generates the C21 detection and C22 tracking codes to track the ranging signal transmitted by the second transmitter 16, delayed from the start of the second time slot by the time of flight of the range between the second transmitter 16 and the mobile receiver 22. The process is repeated for each of the transmitter and receiver channels. After a 1 millisecond or other repeat period, the process is repeated for the same transmitters.

Figure 4:
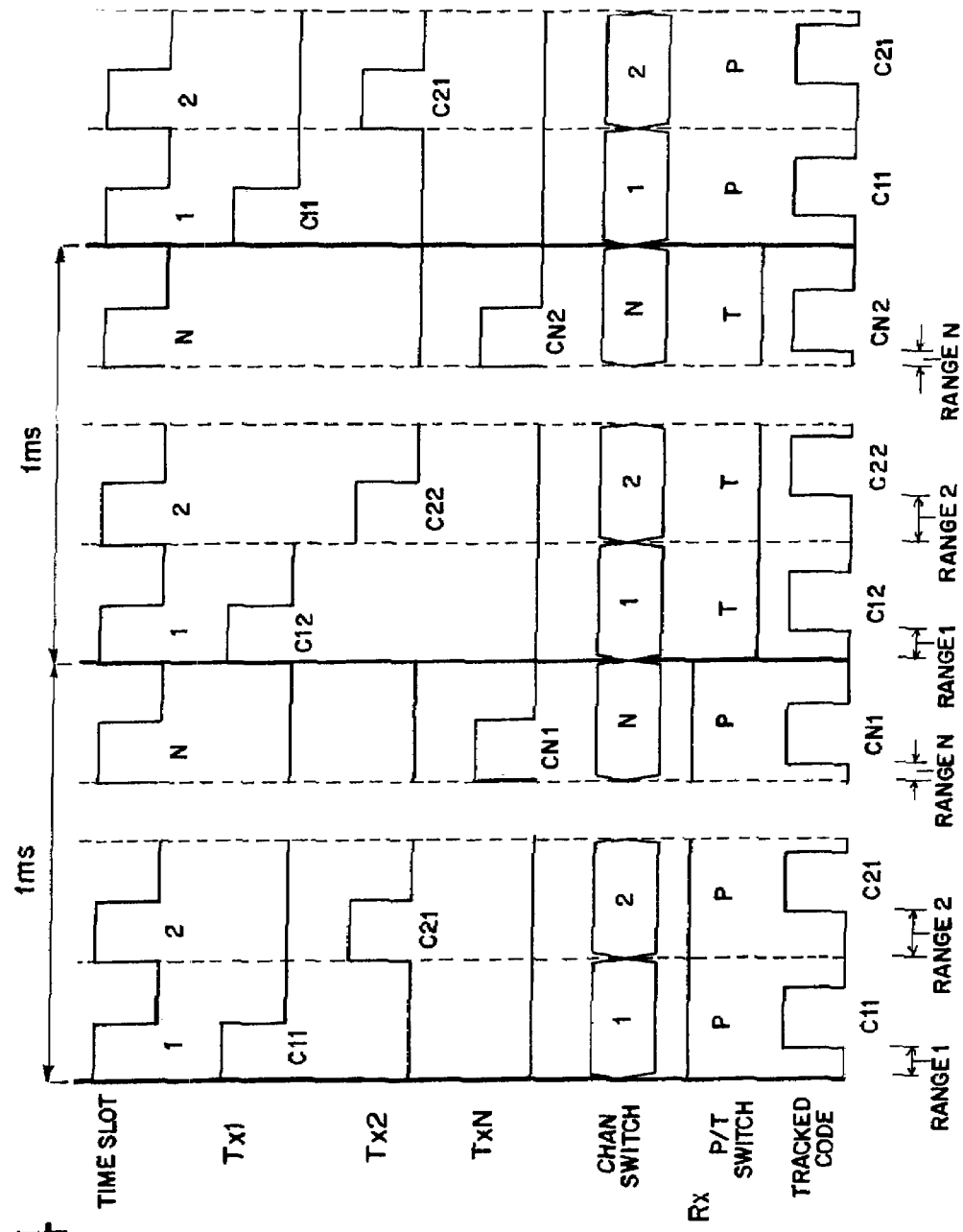
FIG. 4 is a graphical representation of time division multiple access transmissions of another embodiment.

FIG. 4 shows an alternative scheme for transmitting signals than shown in FIG. 3. In the scheme shown in FIG. 4, a transmitter 16 transmits the two different codes in two different repeat cycles. For example, a first code C11 by the first transmitter 16 is transmitted in a first cycle and a second code C12 is transmitted in a second repeat cycle of the time division multiple access scheme. The pair of repeat periods is then repeated. Correspondingly, the receiver generates the replica prompt and tracking codes on alternate repeat periods to correspond to the transmitted signal. In another embodiment, a single code is used by each transmitter 16. In yet another embodiment, continuous, non-TDMA transmission is used by each land-based transmitter 16.

The local ranging signals and positioning system having any one or more of the signal characteristics may be used in many different environments. In the example of FIG. 1, the local positioning system is used in an open pit mine. The local positioning system is used to track and guide machinery such as haul trucks, drills, shovels, or bulldozers. The positioning information is used for machine guidance, machine-tool guidance, geographic surveying, operation scheduling, determining deformation of a wall or other structure to predict collapse and avoiding hazards. Other uses may be provided. Centimeter level accuracy allows these uses to be more versatile. With a real time update rate of 10 Hz or higher, vehicle speeds of about 50 miles per hour may be accurately tracked. Greater or lesser update rates and associated speeds may be provided. By allowing the interaction of a multiple land-based transmitter 16, such as 10 to 100 transmitters, an entire open pit mine may be covered by ranging signals. For any given location within the mine at least four different land-based transmitters are within the line of sight of the mobile receiver. The coverages of 15, 10 or other kilometer sizes. A dynamic range of 10 meters to 10 kilometers is provided.

Another use of the local positioning system is within a construction site. Strategic placement of land-based transmitters may enable centimeter or sub-centimeter level accuracy, such as better than a GPS real time kinematic solution, along any desired dimension. Land-based transmitters placed mostly overhead or below a mobile receiver may improve vertical accuracy to sub-centimeter. A real-time update rate of 10 Hertz or higher allows for detection with vehicle speeds of 30 miles an hour or more. The range of operation is likely less than 1 kilometer. Larger or shorter ranges may be used. The desired dynamic range may be from one meter to one kilometer, but other values may be provided. Using tens of transmitters, an entire construction site may be covered by the local positioning system, allowing tracking and guidance of machinery such as excavators, motor graders or trucks. Operation of scheduling and geographic surveying may also be performed.

Another use for the local positioning system is within a city ("Urban Canyon"). Centimeter level accuracy, such as comparable to the highest available accuracy from GPS, may be desired, but lesser accuracy is possible. A real time update rate associated with 10 Hertz or higher may allow tracking of user speeds of 40 miles an hour or more. Higher speeds may be provided. Given the typical grid or various street layouts of cities, hundreds of transmitters may be used. Alternatively, fewer transmitters are used to cover less of a city. Any of various transmitter ranges may be used, such as line of sight down one or more streets for a kilometer or more. Transmitter powers may be associated with coverage of a limited a number of blocks, such as four or fewer blocks. Using a large dynamic range in power, such as corresponding to tracking ranges in distance from one meter to one kilometer, various locations and tracking operations within the city may be performed. For example, location based services are provided for cell phones or personal data assists. The nearest restaurant or movie theater may then be located using the local positioning system. Vehicle guidance, such as providing map information, is provided even where GPS would be blocked by buildings. Certain vehicles may require their positions monitored continuously for security reasons. Handicapped people may be assisted by determining the location within a city of desired facilities or available entrances.

Yet another use for the local positioning system may be within a warehouse or manufacturing plant for automatic guidance of vehicles to control inventory or for assembly line robot positioning. Race cars, vehicles or animals on a race track may be tracked. Contestants, or objects (e.g., a ball) may be tracked where a local positioning system is set up within a stadium. Cameras may be automatically tracked and guided within the stadium. Other completely enclosed or locations associated with one or more man made or natural walls may take advantage of the local positioning system. Forest regions or jungles being used for seismic studies may also benefit from a local positioning system with ranging signals that may penetrate foliage where GPS signals may not. The local positioning system may alternatively be used in open areas, including small areas or areas over many miles, to augment or replace GPS for more accurate positioning.

The transmitters 12 are either synchronized with each other or have asynchronous clocks. Referring to FIG. 5, various transmitters 16, the reference station 18 and the mobile receiver 22 operate as a synchronized local positioning system. The clocks of the various components are synchronized to a master signal by communicating timing information using radio modems 50 and 52 as well as other radio modems associated with the transmitters 16. The timing of various oscillators in a positioning system is addressed either directly by synchronizing the oscillators or indirectly by continuously measuring time differences between different oscillators. To first order, two oscillators may differ by a phase and by a phase rate. Synchronization may firstly comprise frequency synchronization and secondly phase synchronization. Frequency synchronization involves a feedback control in which a first oscillator's phase rate is driven to zero with respect to another oscillator. Phase synchronization involves a feedback control in which a first oscillator's phase is driven to match a second oscillator. Phase synchronization may be code- and/or carrier-based.

Figure 8:
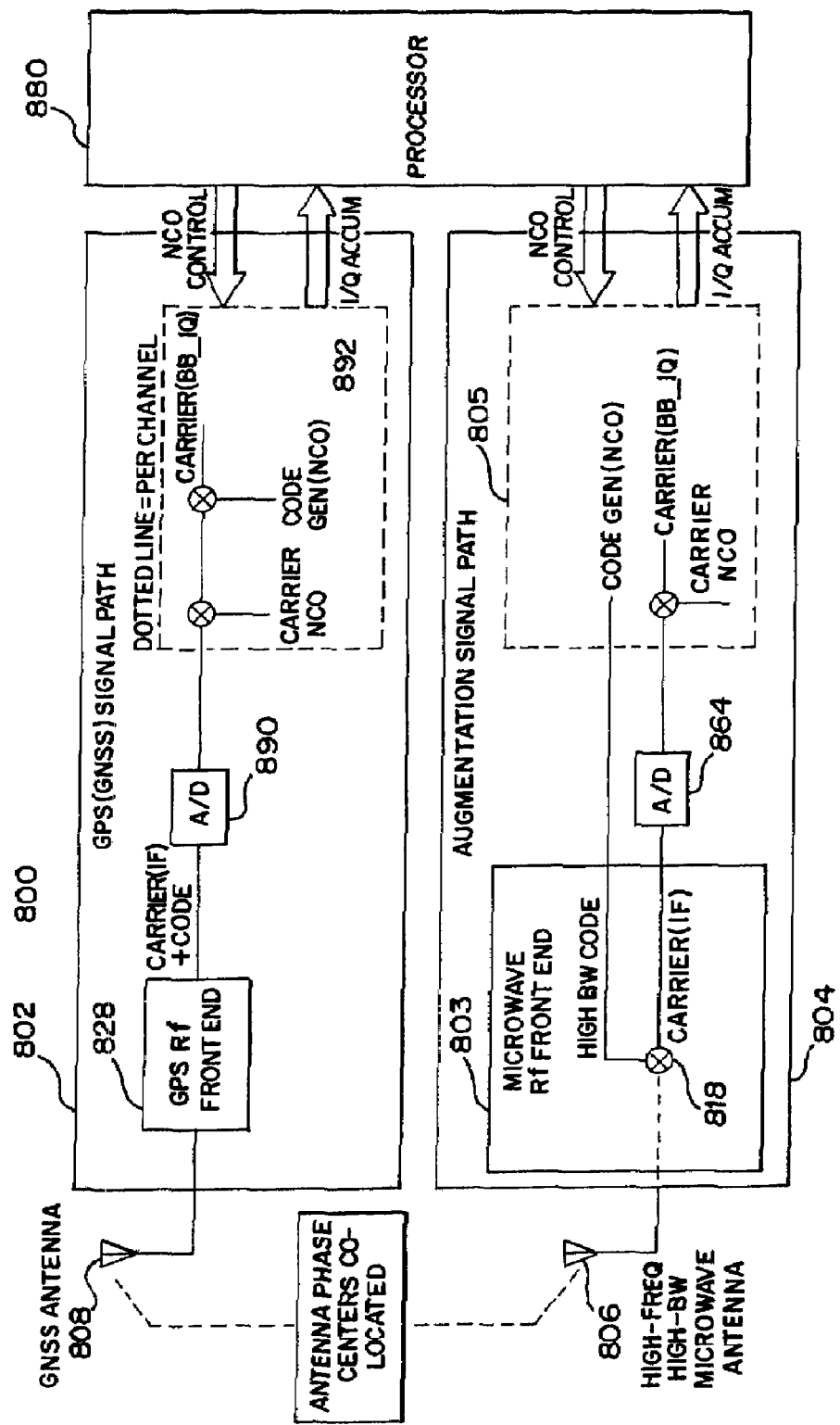
FIG. 8 is a block diagram of one embodiment of a receiver using two different ranging methods.
Figure 9:
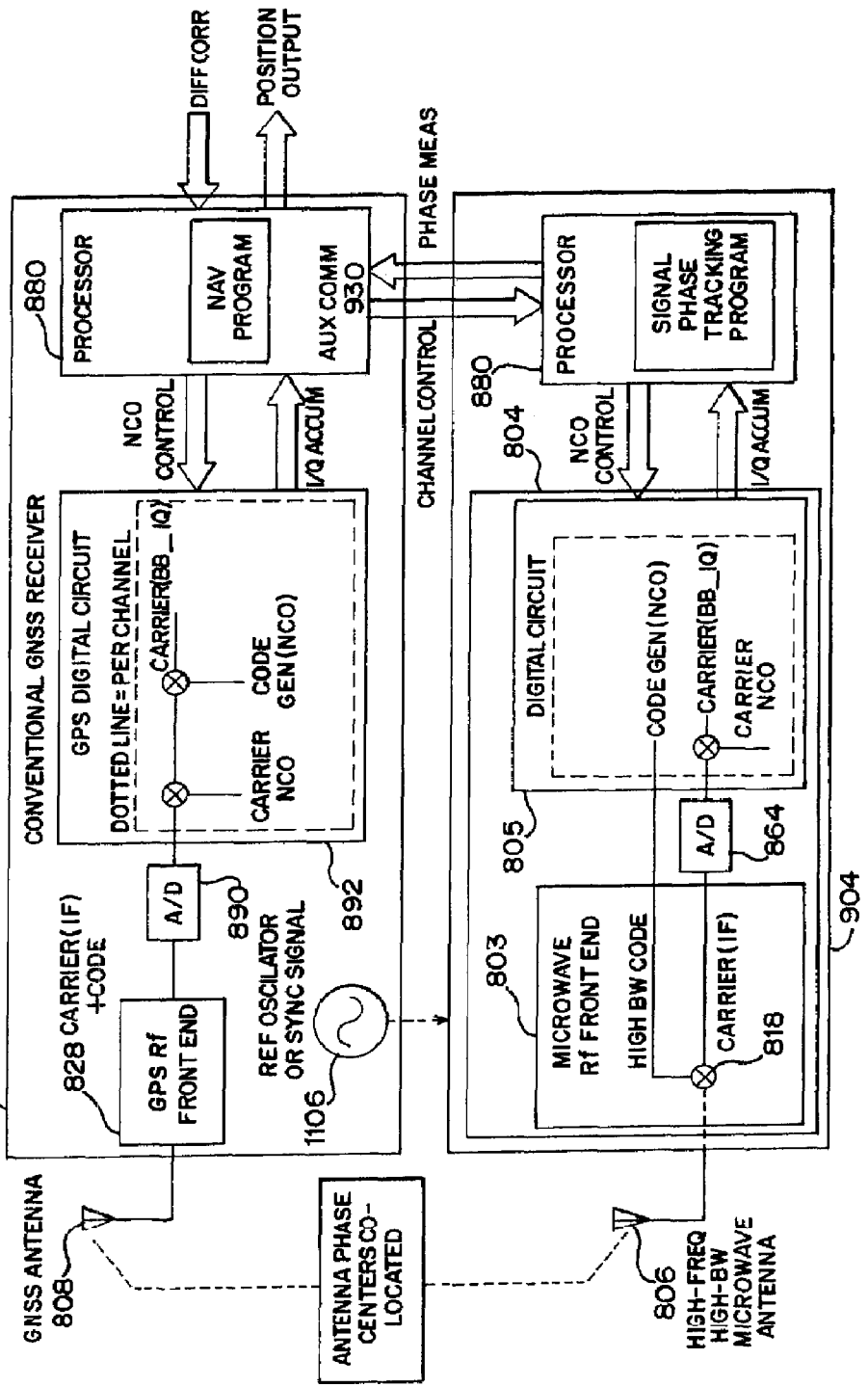
FIG. 9 is a block diagram of another embodiment of a receiver using two different ranging methods.

In one embodiment, each local transmitter 16 is synchronized to an external source, for example a GNSS signal. The local transmitter 16 may be frequency and/or code-phase synchronized to a GNSS signal. Carrier-phase synchronization of a single local transmitter 16 to a GNSS signal may not be performed because carrier measurements have little meaning except in a differential mode. GNSS carrier measurements may be used to filter code measurements. The transmitter 16 is coupled with a GNSS receiver 902 or a local receiver augmented with GNSS 800, 900, as shown in FIGS. 8 and 9. The receiver reference oscillator 1106 is common with a transmitter reference oscillator 700. See FIG. 11. The GNSS or local receiver generates a measure of time offset between the reference oscillator 700 and GNSS and/or local position system when a position solution is generated, as discussed below for equations (4, 6, and 8-12). The reference oscillator 700 or VCO 702 may be adjusted by careful slewing until the time bias is zero or nearly zero.

In another embodiment, a transmitter 16 is coupled with a local receiver with or without GNSS augmentation 800, 900. See FIGS. 8 and 9. The transmitter signal either downstream of the antenna 720 or upstream of the antenna 720 is self-monitored by receiving the signal at the receiver antenna 806, or further downstream of the antenna 806, and then comparing the phase and phase rate of the self-monitored signal to an external synchronization source, such as a GNSS or local position system. The phase and phase rate of the self-monitored signal may be driven to zero by adjusting the reference oscillator 700 or the VCO 702 until the phase and phase rate of the self-monitored signal are driven to zero or nearly zero.

With synchronized transmitters 16, the relative timing information may be used by the mobile receiver 22 and/or the reference station 18. Using a wireless radio link, such as a 900 MHz radio link, 802.11 or other ISM band radio communications link for the modems 50, 52, differential corrections and other timing information are received from the reference station 18 or other device by the mobile receiver 22. In alternative embodiments, the radio 50 associated with the reference station 18 is instead provided on a transmitter 16. The reference station 18 and transmitter 16 are alternatively connected using a cable, such as a coaxial cable, or other device for transmitting clock information. In yet another alternative embodiment, each of the transmitters 16, reference station 18 and/or mobile receiver 22 are synchronized to the GPS or other GNSS system. Synchronization is achieved via GNSS timing, an RF synchronization pulse, or other signal. Using a change in position of the GPS satellites and/or the mobile receiver 22, integer cycle resolution may be resolved for the GPS signals to obtain relative timing information accurate to sub-nanosecond.

Code phase measurements are made simultaneously or nearly simultaneously at the reference station 18 and the mobile receiver 22. The code phase measurements made by the reference station 18 are broadcast to the mobile receiver 22. The mobile receiver also measures the code phase and computes a differential code phase between the two measured phases. The location of the mobile receiver 22 relative to the reference station 18 is calculated from the differential phase measurements in combination with pre measured relative locations of each of the transmitters 16 to the reference station 18.

Figure 6:
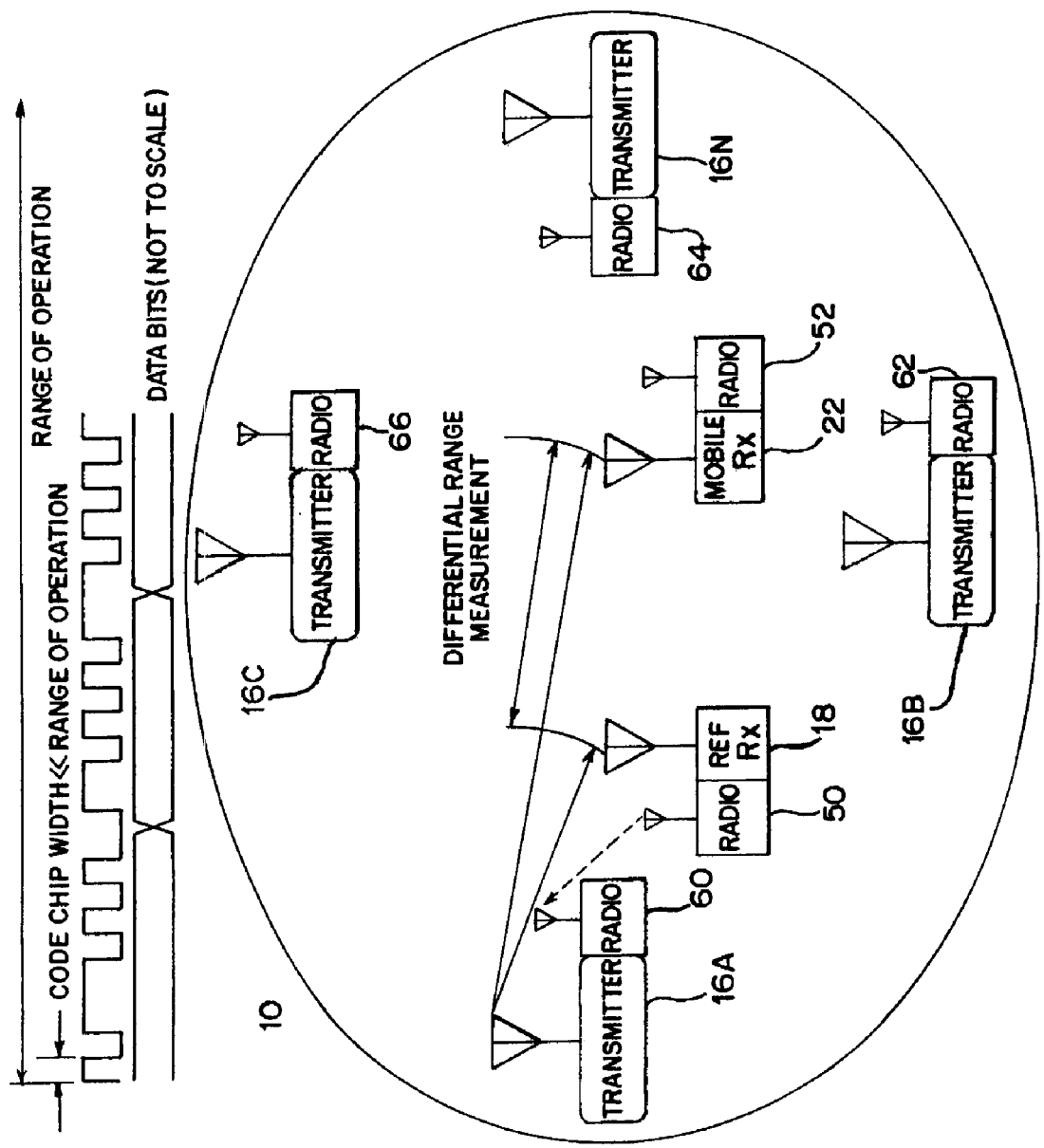
FIG. 6 is a graphical representation of the distribution of local transmitters and receivers for differential positioning in another embodiment.

FIG. 6 shows an asynchronous system of one embodiment of the system 10 where the reference station 18 acts as a common timing reference for the system 10, allowing the transmitters 16 to be free running or have unsynchronized oscillators. Alternatively, one or more of the transmitters 16 acts as a common timing reference. The mobile receiver 22 may be free of a radio or other wireless communication device to achieve accurate positioning. The system 10 provides relative timing for a plurality of the transmitters 16. Each of the transmitters 16 is associated with a corresponding radio 60, 62, 64 and 66 or other wireless communications device. The radios 60-66 are wireless communications devices, such as transceivers, receivers, modems, or other communications devices. The radios 60-66 and 50 form a wireless or wire communication network, such as a network operating pursuant to the 802.11 specification. Other communications protocols may be used. In alternative embodiments, a wire communication device is used, such as coaxial cables and associated modems. In other embodiments, one or more of the transmitters 16 is free of the radio 60-66. To synchronize the system 10 with asynchronous transmitters 16, the reference station 18 is operable to receive the ranging signals from one or more of the transmitters 16. For example, the reference receiver 18 receives the spread spectrum ranging signals on a communications path, such as via an X-band signal. Where the reference station 18 is operable or positioned to only receive ranging signals from less than all of the transmitters 16, a different reference station 18 may be provided at a different known location. The various reference stations 18 are synchronized with each other, such as through wire or wireless communications.

The reference station 18 generates timing offset information for the ranging signals. For example, the reference station 18 calculates a carrier or code phase offset of the ranging signal from one transmitter 16A relative to a clock of the reference station 18. Timing offset information is calculated for each of the received ranging signals or transmitters 16. Using the phase measurements, the timing offset information determines a relative phase of the corresponding transmitter to the clock of the reference station 18. Different or the same timing offsets are calculated for the different transmitters 16.

Using the radio 50, the reference station 18 transmits the timing offset information for one or more transmitters 16 back to the same or a different transmitter 16. In one embodiment, the timing offset information for each transmitter 16 is communicated to the corresponding transmitter. In another embodiment, timing offset information from a plurality of transmitters 16 is communicated to a single transmitter 16A. The transmission from the reference station 18 to one or more of the transmitters 16 is performed over a different communications path than used to transmit the ranging signals. For example, the communications path is provided on the wifi or radio network using different carrier frequencies, coding or other characteristic than the communications path used for transmitting and receiving ranging signals. The network of radios 50, 60-66 communicate at lower frequencies than the X-band or ISM-band.

One or more transmitters 16 receive timing offset information from the reference station 18. In one embodiment, the radios 60-66 receive the timing offset information as wireless communication receivers from the wireless communications transmitter of the radio 50. The transmitter or transmitters 16 are responsive to the received phase measurements. The phase measurement data is collected or assembled into a data package structure.

The data is then communicated to the mobile receiver 22 from the transmitter or transmitters 16. The transmitter 16 is operable to transmit both ranging signals and the timing offset information for the ranging signals. Each transmitter 16 transmits a unique ranging signal and corresponding offset information or transmits offset information for a different transmitter 16. The timing offset information is transmitted in a same communications path as the ranging signals. For example, the transmitter 16A transmits ranging signals to the mobile receiver 22 along a communications path in the X-band or ISM-band of frequencies. The ranging signal is modulated by the timing offset information. For example, an exclusive-OR (XOR) two-bit sum of the code and data is used. The spread spectrum code used for the ranging signal is occasionally flipped by the data, such as every one to four instances of the code being transmitted. Less frequent modulation may be used. Each flip of the code represents a change in data. The mobile receiver 22 determines the data value based on a known frequency of modulation. Other modulation may be used. By receiving both ranging signals and timing offset information in a same communications path or part of a same signal, the mobile receiver 22 may be free of communications with the transmitters 16 and/or reference station 18 other than the reception of ranging signals. "Free of communications with the transmitter" includes communications for synchronization but may exclude communications for communicating a determined position of the mobile receiver 22 for use by operators or other systems. The same carrier frequency band is used for transmitting both ranging signals and timing offset information.

In one embodiment, the oscillators in the transmitter 16 and receivers 18, 22 are unsynchronized or free running. A phase stability in accord with the accuracy of the system 10 over the measurement period of the receivers 18, 22, such as a period over 1 to 100 milliseconds, is provided for allowing synchronization of asynchronous clocks through the communications described above. The timing offset information is originally calculated based on one ranging signal transmission but then transmitted to the mobile receiver with other subsequent ranging signals. Given the stability of asynchronous oscillators, the phase measurements are sufficiently accurate to allow resolution of any carrier cycle phase ambiguity. While the clocks of the various transmitters 16A and receivers 18, 22 are unsynchronized or asynchronous, the transmission slot timing for the TDMA transmission is synchronized between the transmitters 16. Since the timing slots for TDMA are associated with a longer period than a clock cycle, a few microseconds of tolerance for timing slot synchronization may be allowed.

In alternative or additional embodiments, the reference station 18 measures the phase from a GNSS or satellite based ranging signal. The timing offset information is transmitted to a transmitter 16 of the local positioning system for modulation and transmission with ranging signals to the mobile receiver 22. The mobile receiver 22 may then calculate position based on differential phase measurements from both the local positioning system and a GNSS system.

The mobile receiver 22 receives the ranging signals and timing offset information from one or more transmitters 16.

For each transmitter 16 that communicates timing offset and ranging signals to the mobile receiver 22, a single communications path is provided. The ranging signals modulated by timing offset information are received free of communication or reception of other information in a different communications path with the same transmitter 16. For example, the ranging signals and timing offset information are received in X-band or ISM-band signals.

The mobile receiver 22 determines the position as a function of the ranging signals and the timing offset information. The phase measurements from the reference station 18 provide the relative clock timing of the various transmitters 16. A differential phase measurement is performed by the mobile receiver 22 using the timing offset information from the reference station 18. A position of the mobile receiver 22 is determined from the differential phase measurements. Using the high modulation rate and code phase measurements without the carrier phase determination allows measurement of the position with high accuracy, such as centimeter level resolution, without measurements of the carrier phase ambiguity. Using a code length set relative to a region of operation, a more immediate distance of the ranging signals and associated position information from a plurality of distances are determined. Initialization, such as using measurements based on relative motion between different components of the system 10, is avoided while still attaining an unambiguous accurate position. Integer cycle resolution measurements of carrier phase may be avoided. In alternative embodiments, carrier measurements and a corresponding integer cycle resolution process are performed.

Figure 7:
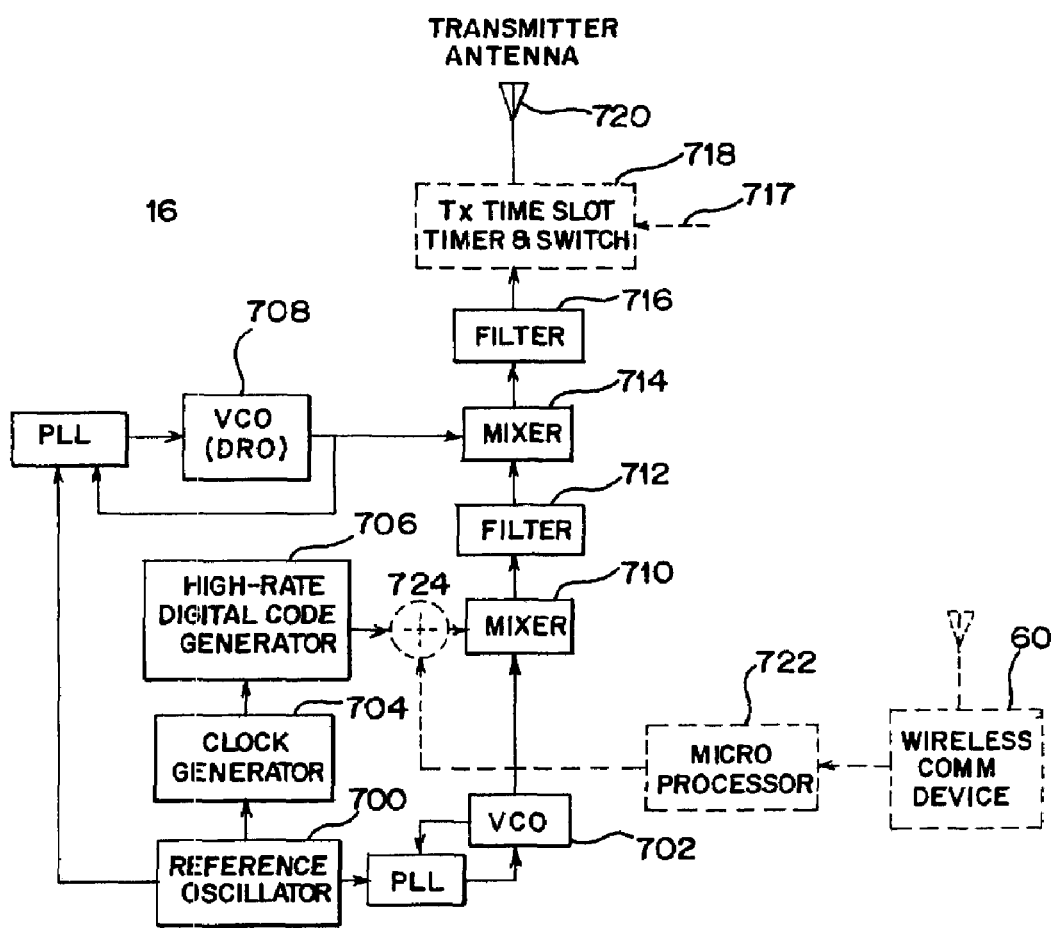
FIG. 7 is a block diagram of one embodiment of a land-based transmitter.

FIG. 7 shows one embodiment of a transmitter 16. The transmitter 16 is operable to modulate timing offset information received from a reference station 18 into the same communications signal as ranging information, but may alternatively generate ranging signals free of additional timing offset information. Each transmitter 16 of the system 10 of FIGS. 1, 5 or 6 have a same structure, but different structures may be provided. Each transmitter 16 generates ranging signals with the same or different code and/or type of coding. The transmitter 16 includes a reference oscillator 700, a voltage controlled oscillator 702, a clock generator 704, a high rate digital code generator 706, another voltage controlled oscillator 708, a mixer 710, a filter 712, another mixer 714, another filter 716, a timer and switch 718, an antenna 720, a radio 60, a microprocessor 722 and a summer 724. Additional, different or fewer components may be provided, such as providing a transmitter 16 without TDMA transmission of codes using the timer and switch 718 and/or without the radio 60, microprocessor 722 and summers 724 for receiving phase measurements from the reference station 18. As another example, an oscillator, GPS receiver, microprocessor and digital-to-analog converter are provided for synchronizing the reference oscillator 700 with a GPS system.

The reference oscillator 700 is an oven control crystal oscillator, such as a 10 MHz crystal oscillator. Other crystal or stable oscillators with a very low timing jitter over 1 to 100 milliseconds may be used, such as a Rubidium (Rb) oscillator. Low timing jitter over 1 to 100 milliseconds is desired, but longer term instability may be allowed. Other relative time periods of short and long term stability may be provided, such as a period based on being larger than a receiver's phase tracking control bandwidth and/or phase measurement period. In one embodiment, the oscillator 700 is free running relative to any external source. The reference oscillator 700 is free of synchronization to an external source. In another embodiment, the oscillator may be synchronized to an external source. The ranging signal and other operation of the transmitter 16 are responsive to the reference oscillator 700. The reference oscillator 700 allows generation of a carrier frequency with sufficient bandwidth to support a high rate spread spectrum code, such as a code having a 30 MHz or higher modulation rate.

The reference oscillator 700 controls two additional oscillators 702 and 708. The oscillator 702 is a voltage controlled oscillator operable to generate an intermediate frequency signal, such as a 1400 MHz signal. Other intermediate frequencies may be used. The oscillator 708 is also a voltage controlled oscillator. In one embodiment, the oscillator 708 is a phase-locked dielectric resonator oscillator (PLDRO). The oscillator 708 provides low timing jitter over 1 millisecond to 100 milliseconds time period. Using phase comparisons to the reference frequency from the reference oscillator 700, the frequency output by the oscillator 305 is adjusted to a desired frequency, such as a frequency in the X- or ISM-bands. The oscillator 708 is phase locked to the reference oscillator 700 using a Phase Lock Loop (PLL) circuit, such as is available with a programmable chip or discrete components. In one embodiment, the reference oscillator 700 and/or VCO's 702 and 708 are associated with frequencies allowing conversion to any ISM or X-band frequencies.

The clock generator 704 and high rate digital code generator 706 are components of a receiver, in one embodiment, used to generate the same code used for correlation measurements in receivers. Alternatively, different components are provided. In one embodiment, the clock generator 704 is a programmable phase locked clock generator producing 30 MHz, 80 MHz, 200 MHz or other value signal for driving the code generator 706. The code generator 706 is a transmitter of the code for the ranging signal. The code generator 706 is a field programmable gate array, but other devices for digital logic processing, such as ASICS, processors, or discrete logic chips, combinations thereof or other now known or later developed devices for generating a Gold, MLFSR, Kasami, or other pseudo random or other code may be used. In one embodiment, a field programmable gate array is programmed to provide a constant modulation rate. The code generator 706 generates the DSSS code. The DSSS code is a pseudo random noise sequence, such as of MLFSR type code, or other code. The code generator 706 outputs a code at desired frequency, such as 30 MHz or other modulation rate. The modulation rate is a multiple of the frequency of the crystal oscillator 700. A digital-to-analog converter, such as a 2 bit digital-to-analog converter, for example, a pair of matched resistors, converts the output code to an analog code for transmission.

The mixer 710 is an analog or digital multiplier, high RF isolation Double Balanced Mixer (DBM), balanced mixer or other now known or later developed mixer. The mixer 710 mixes the high rate digital code output by the generator 706 with the first local oscillator output by the oscillator 702.

The filter 712 is a high band ceramic filter. The filter 710 removes spurious mixing products. In alternative embodiments, the filter 307 is a microstrip filter.

The intermediate frequency signal is further up converted by the mixer 714. The mixing 714 is a double balanced mixer, but a microstrip or other mixers may be used. The signal output by the oscillator 708 is mixed with the intermediate frequency to generate the final stage carrier signal. The two signals are phased locked to the reference oscillator 700. The mixing results in the desired ranging signal.

After up-conversion by the mixing 714, the filter 716 filters the signal. The filter 716 is a local oscillator and image rejection filter, such as a microstrip or a waveguide filter. The resulting signal is broadcast from the X-band or ISM-band transmission antenna 720.

If the transmitter 16 is used in a time division multiple access manner, the timer and switch 718 controls the timing of the transmission of the ranging signal from the antenna 720. The timer and switch 318 is a radio frequency switch, transistor, PN diode, GAASFET, gate connected switch or other switch for turning off and on the output of the ranging signal in desired time slots. In one embodiment, the switch 718 is positioned between the filter 712 and the mixing 714 or elsewhere within the transmitter 16. In one embodiment, the time slot for transmission for a given transmitter 16 is determined by a timer, such as a counter, synchronized with some external synchronization signal 717, such as GPS, an RF pulse, or other signal. In one embodiment, assignment of a timeslot may be programmed through a microprocessor 722 within the transmitter 16 or received from an external source. For example, the transmitter 16 includes one or more receivers for receiving ranging signals from other transmitters 16. An available time slot where the lack of transmission occurs over a given time period is then selected for use by a given transmitter 16. As another example, a time slot assignment is communicated using a wireless or wired network. The timer and switch 718 are controlled to operate in accord with the appropriate time slot.

For communicating timing off-set information or other data, the microprocessor 722 is a digital signal processor, field programmable gate array, application specific integrated circuit, analog circuit, digital circuit or other now known or later developed processor for converting received timing offset information into data. The processor 722 generates the desired packet or data value at a given time and operates to control flipping or alteration of the code being transmitted. The summer 724 acts to flip the code or modulate the code output by the generator 706. In one embodiment, the adder 724 is an XOR gate within the field programmable gate array of the code generator 706; but alternatively, the adder 724 may be a separate analog or digital summing device for selectively inverting the generated code.

Other transmitted data includes coarse-grade timing information that enables a mobile receiver to distinguish a time basis in coarser granularity than the code repeat period. A unique data pattern that repeats over some longer time span, which could be one second, several seconds, minutes, or even years, can be used to enable a mobile receiver to align its phase measurements with phase measurements from a reference receiver taken simultaneously but delayed by several tens of milliseconds due to transmission delay over a wireless communication.

In the system 10 shown in FIG. 6, each of the transmitters 16 includes an oscillator 700 shown in FIG. 7. The oscillators 700 of the various transmitters 16 are free of synchronization with each other. The clocks have no phase synchronization, so are free running relative to each other or another external source. Alternatively, external synchronization is provided.

To determine the location of the mobile receiver 22 relative to a frame of reference other than the local positioning system, the location of each of the transmitters 16 is determined. In one embodiment, the location of each of the transmitters 16 is surveyed manually or using GNSS measurements. Laser-based, radio frequency or other measurement techniques may be used for initially establishing locations of the various transmitters 16 and/or reference station 18. Alternatively, transmitted ranging signals received at two or more other known locations from a given transmit antenna 720 are used to determine a position along one or more dimensions of a phase center of the given transmit antenna 720.

Figure 17:
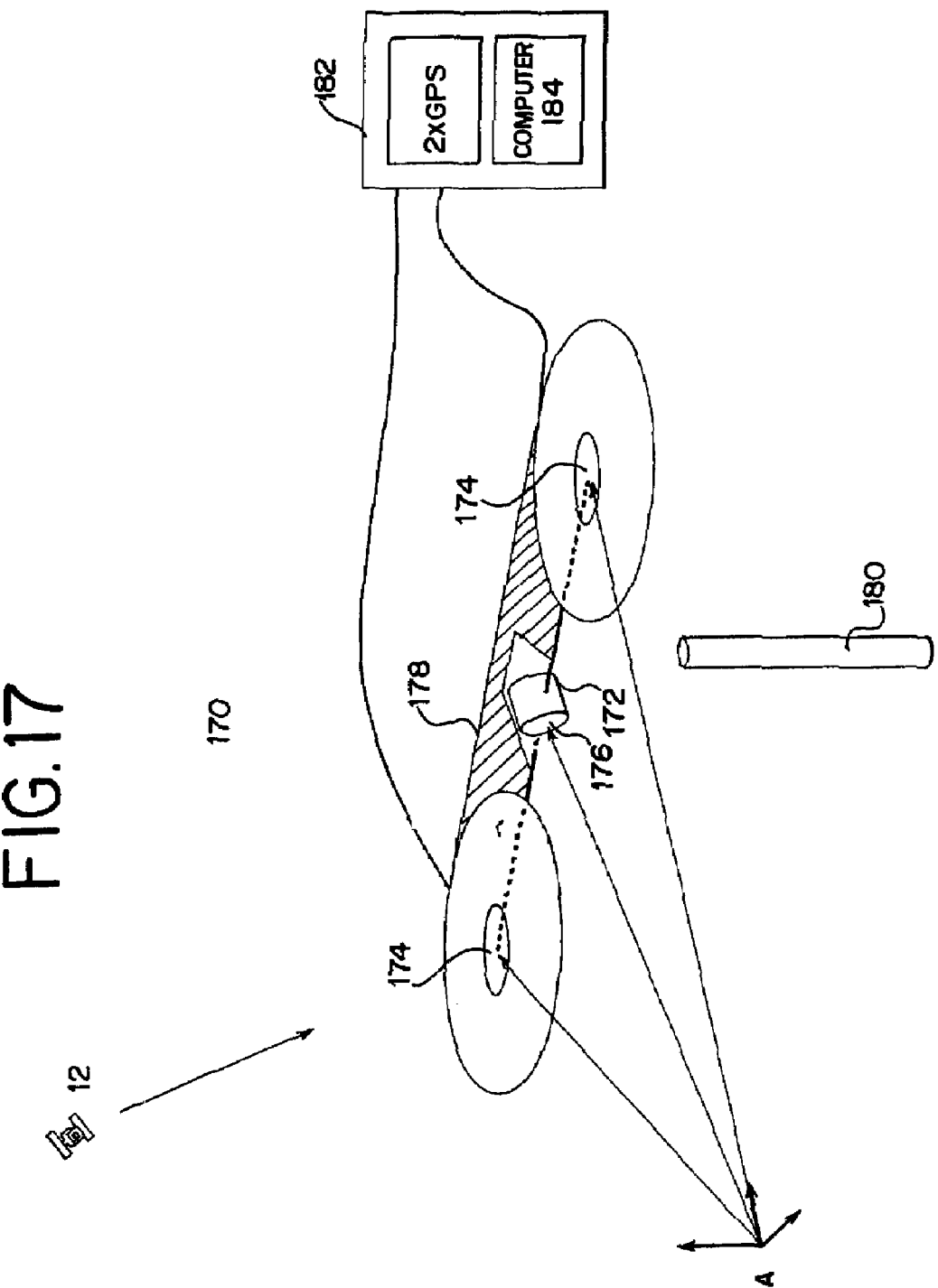
FIG. 17 is a graphical representation of one embodiment of self-surveying transmitter antenna of a local positioning system.

In another embodiment, the electromagnetic phase center of a transmit antenna 720 is measured with one or more sensors relative to a desired coordinate system or frame of reference. Knowing the electrical phase center allows for more accurate position determination. In one embodiment, a phase center is measured relative to a GNSS coordinate frame. FIG. 17 shows a system 170 for determining a position of a transmit antenna 172 using two receive GPS antennas 174. The accuracy of the position measurement is the same or better than a real-time kinematic, differential GPS solution (e.g. centimeter level). In one embodiment, the transmit antenna is located between the two receive antennas, such that the transmit antenna phase center is substantially in the middle of the phase centers of the receive antennas. In this situation, the transmit antenna position can be determined by averaging position measurements from the 2 GPS antennas 174. In this embodiment, the spatial relationship of the transmit antenna with respect to any one receive antenna need not be known in advance. In another embodiment, the spatial relationship of the transmit antenna with respect to one or more receive antennas is known. In this situation, the transmit antenna position can be determined from the known spatial relationship and the measured position of the one or more receive antennas. Any error in measurement of the phase center may not necessarily correspond to a one-to-one error in a position determination. Where differential measurement is used, any error in the phase center measurement may result in a lesser error for a position determination of the mobile receiver 22.

The system 170 for measuring a position of the transmitter location includes the receive sensors 174, a transmit antenna 172, a linkage 178, a stand 180, sensor electronics 182 and a computer 184. Additional, different or fewer components may be provided, such as providing additional receive sensors 174.

The transmit antenna 172 is a microwave antenna, such as an antenna operable to transmit X-band or ISM-band signals. The transmit antenna 172 corresponds to the antenna 720 of FIG. 7 in one embodiment. The transmit antenna 172 has a phase center at 176. The transmit antenna may be a helix, quad helix, patch, horn, microstrip, or other variety. The choice of the type of antenna may be based on beam pattern to cover a particular volume of the region of operation. The receiver antennas described later in this document also may be suitable as transmit antennas.

The receive sensors 174 are GPS antennas, GNSS antennas, local positioning system antennas, infrared detectors, laser detectors, or other targets for receiving position information. For example, the receiver sensors 174 are corner reflectors for reflecting laser signals of a survey system. In the embodiment shown in FIG. 17, the receive sensors 174 are GPS antennas. While two GPS antennas are shown, three or more GPS antennas may be provided in alternative embodiments. The sensor electronics 182 connect with each of the sensors 174. For example, the sensor electronics 182 are a receiver operable to determine a position or range with one or more GPS antennas. Real time kinematic processing is used to resolve any carrier phase ambiguity for centimeter level resolution of position information. The sensor may be another local position system receiver, and the antennas may be local position.

The linkage 178 is a metal, plastic, wood, fiberglass, combinations thereof or other material for connecting the receive sensors 174 in a position relative to each other and the transmit antenna 172. The transmit antenna 172 is connected with the linkage 178 at a position where a line extending from the two receive sensors 174 extends through the phase center 176 of the transmit antenna 172. In one embodiment, the transmit antenna 172 is connected at a center of the line extending from the phase centers of the receive sensors 174, but any location along the line may alternatively be used. In one embodiment, the transmit antenna 172 and associated phase center 176 is adjustably connected to slide along the line between the phase centers of the two receive sensors 174. A set or fixed connection may alternatively be used. In another embodiment, the transmit antenna 172 is rotatably or pivotably connected to the linkage 178 to allow rotation of the transmit antenna 172 while maintaining the phase center 176 at or through the line between the two receive sensors 174. An optional sensor, such as inclinometer, optical encoder, rate sensor, potentiometer or other sensor, may be used to measure the rotation of the transmit antenna 172 relative to the linkage 178.

The computer 184 is a processor, FPGA, digital signal processor, analog circuit, digital circuit, GNSS position processor or other device for determining a position of the transmit antenna 172. The position of the transmit antenna 172 is determined with reference to a coordinate frame A. The locations of each of the transmit and receive antennas 172, 174 are measured from the respective electromagnetic phase centers. In one embodiment, the distance along the line from each of the receive antennas 174 to the transmit antenna 172 is not known, but the ratio of the distances is known, such as half-way between the receive antennas. The position of the transmit antenna 172 is calculated from the position determined for each of the receive sensors 174. The computer 184 measures signals received from the receive sensors 174 and calculates positions of both of the receive sensors 174. The computer 184 calculates the position of the transmit antenna 172 as an average or weighted average of the two receive antenna position measurements. Using a separate rotational sensor measurement, the directional orientation of the transmit antenna may also be determined. The relative attitude or orientation of the antennas need not be known to determine the location of the transmitter 172, but may be used to provide an indication of the orientation of the transmit antenna 172.

The system 170 is positioned at a desired location, such as on the ground, on a structure, on a building or on a tower. The position of the receive sensors 174 is then calculated, such as by ranging signals from a plurality of satellites 12. The resulting location of the transmitter 172 is relative to the coordinate frame of reference based on the position of the transmitter 16 on the earth.

In an alternative embodiment, a plurality of GNSS antennas, such as 3 or more, is used to measure a position and orientation of the linkage 178. The position and orientation of the transmit antenna 172 with respect to the 3 or more GNSS antennas is known. By measuring the positions of the 3 or more GNSS antennas in coordinate frame A and knowing the position and orientation of the transmit antenna 172 with respect to 3 or more GNSS antennas fixed to linkage 178, the position of transmit antenna 172 is determined relative to frame of reference A using standard geometric principles. In yet another alternative embodiment, the position of the transmit antenna in frame of reference A may be determined using any other sensor for measuring the orientation and/or position offset with respect to one or more GNSS antennas.

FIGS. 8, 9, 10, 11 and 18 show different embodiments of the receiver station 18 and/or mobile receiver 22. The same type of receiver is used for both the reference station 18 and the mobile receiver 22 in one embodiment, but different types of receivers may be used. Similarly, code generation components of the receiver 18, 22 may be used for generating the ranging signals in the transmitters 16. In one embodiment, the reference station 18 is positioned adjacent to or is part of a transmitter 16. Alternatively, the reference station 18 is positioned away from any of the transmitters 16. In one embodiment, the mobile receiver 22 includes one antenna for determining a position. In other embodiments, two or more antennas are provided for determining the relative positions of two components or a position and orientation of a mobile device. The same circuitry may be used for each of the different antennas or separate receivers provided for each of the antennas.

FIGS. 8 and 9 show two alternative embodiments of a receiver 800, 900. In the embodiments shown, the receiver 800, 900 is an augmented receiver capable of receiving both GNSS and local positioning ranging signals. For example, the receiver 800 includes a GPS signal path 802 and a local position system signal path 804. As another example, the receiver 900 includes a GNSS receiver 902 and a local positioning receiver 904. In alternative embodiments, the receiver 800, 900 includes only a local positioning signal path 804 or receiver 904. The receiver 800, 900 is operable to receive and track the code phase of ranging signals in X-band, ISM-band or other frequency bands with a modulation rate higher than GPS signals. The tracking may be performed in environments with high temperature fluctuation or ranges. Signals from multiple transmitters 16 using the same or different codes are received using a same receiver or antenna 806. For example, time division multiplexing allows use of the same antenna 806 and signals path 804 or receiver 904. In one embodiment, analog decorrelation and/or down conversion is provided. Given potential modulation rates of 200 or more Megahertz for an X-band ranging signal, analog decorrelation and/or down conversion is performed on the ranging signals received using one analog path. One, two or more different coding schemes may be used, such as a prompt code to detect that a signal exists and a tracking code scheme to provide feedback control or an error signal. In one embodiment, an early-minus-late form of tracking scheme is used where alignment results in a zero error.

Figure 18:
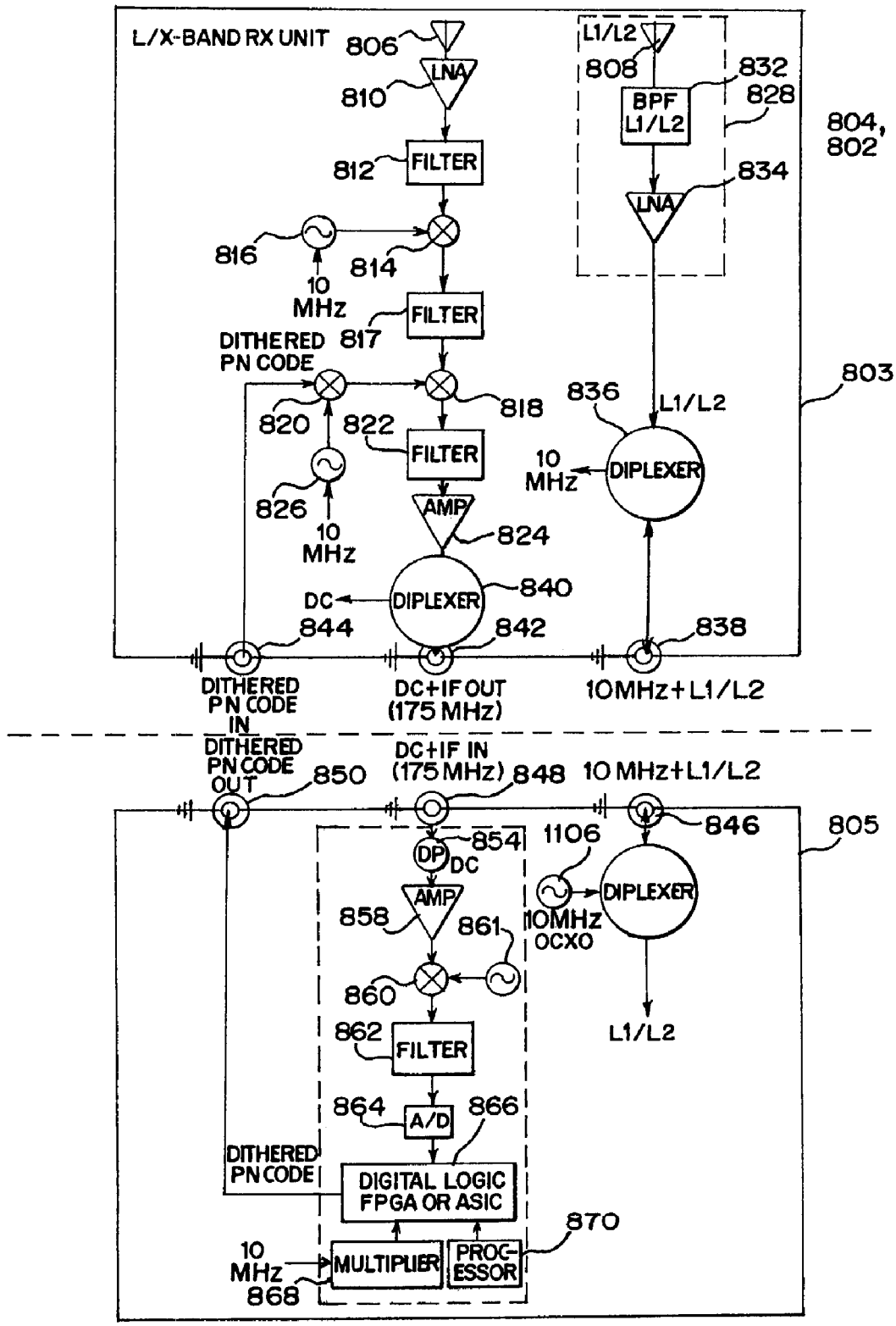
FIG. 18 is a block diagram of one embodiment of a receiver.

FIG. 18 shows one embodiment of the local positioning system signal path 804 combined with the GPS signal path 802. The local positioning system signal path 804 uses analog decorrelation and down conversion where a down converter is separated from or spaced remotely from the digital circuitry of the receiver. The local positioning system signal paths 804 without the separation, and/or with digital down conversion are provided in alternative embodiments. The signal path includes a local position signal antenna 806, and a GNSS, such as GPS, antenna 808. The signal path 804 includes a microwave radio frequency front end 803 and an analog and digital back end 805. In alternative embodiments, the front end 803 is connected directly with, positioned within a same box, formed on a same circuit board, or is part of a same unit as the back end 805. A single signal path 804 is used for receiving ranging signals from each of the transmitters 16, but different signal paths may be used for alternative processing schemes.

In one embodiment a first path is used for measuring a detect signal and second path is used for measuring a track signal. In such an embodiment, the detect and track measurements are made simultaneously. The Detect/Track switch 1018 is eliminated and instead, the detect and track signals from the code generator 1014 each connect with separate channel switches 1002, and each of the separate channel switches 1002 connects with separate mixers 818. In another embodiment, different signal paths may be used for receiving from different groups of transmitters 16, such as with different groups of transmitters 16 using different coding or carrier frequencies. In one embodiment, the local positioning system signal path 804 is implemented with a modified L2 path of a GPS receiver.

The front end 803 applies automatic gain control, down converts the signal to a first intermediate frequency, mixes the signal with an internally generated code to decorrelate the ranging signal code, further down converts to a second intermediate frequency and converts the analog signal to a digital format. The front end 803, 828 includes two general signal paths, one for GPS or GNSS augmentation (832-834) and another for receiving local positioning raging signals (810-826). The path for receiving local positioning signals includes an LNA 810, a filter 812, a mixer 814, an oscillator 816, another filter 817, another mixer 818, yet another mixer 820, an oscillator 826, yet another filter 822 and an amplifier 824. Additional, different or fewer components may be provided, such as additional or fewer filters, mixers, multiplexers and separate paths. One example embodiment of the components is used for 9,750 MHz ranging signals.

The LNA 810 amplifies and outputs the signals to the filter 812. The LNA 810 may contain an automatic gain control to adjust the average power level of the incoming signal. The filter 812 is a band pass filter with a center frequency response at the carrier wave frequency and a bandwidth about twice the expected modulation rate, such as plus and minus 200 MHz. The filter 812 may be a microstrip or a waveguide filter or other filter. The band pass filtered ranging signals are provided to the mixer 814. The mixer 814 is a double balanced mixer, but a microstrip or other mixers may be used. The mixer 814 is responsive to the oscillator 816.

The oscillator 816 is a dielectric resonator oscillator phase locked to a 10 MHz reference oscillator 1106. The oscillator 816 provides low timing jitter over 1 millisecond to 100 milliseconds time period. Using phase comparisons to the reference frequency from the reference oscillator 1106, the frequency output by the oscillator 816 is adjusted to a desired frequency, such as a frequency in the X- or ISM-bands. The oscillator 816 is phase locked to the reference oscillator 1106 using a programmable chip. In one embodiment, the reference oscillator 816 and/or VCO's 826 and 861 are associated with frequencies allowing down conversion from any ISM or X-band frequencies.

The mixer 814 is operable to down convert the receive signals to an intermediate frequency. The down converted signals are filtered by the filter 817. The filter 817 is a band pass filter centered on an intermediate frequency, such as 1,466 MHz with a bandwidth similar to the bandwidth of the filter 812 (e.g. plus and minus 200 MHz.). The mixer 814 is a double balanced mixer for performing analog decorrelation of the ranging signals, similar to mixer 814. The oscillator 826 is a voltage controlled oscillator responsive to the reference frequency, such as the 10 MHz reference frequency oscillator 1106.

In one embodiment, the oscillator 826 outputs a 1,291 MHz signal to the mixer 820. The mixer 820 is a double balanced or balanced mixer responsive to a dithering or replica code corresponding to an expected ranging signal coding. The output code is mixed with the ranging signal by the mixer 818. When a replica code provided on the connector 844 is aligned within one chip of the code of the incoming ranging signal, a narrow band of signal of power proportional to the degree of alignment of the codes is output from the mixer 818.

The decorrelated signal is then filtered by the filter 822, such as a band pass filter having a center frequency of 175 MHz with a 10 MHz bandwidth. Filter 822 may be a SAW, microstrip or other filter technology. The amplifier 824 amplifies the demodulated down converted ranging signal for transmission over a cable, such as coax cable. In alternative embodiments, the amplifier 824 is bypassed or used for amplifying the signals for transmission to other components on a same circuit board. Other frequencies, type of components, arrangements of components and devices may be used.

Augmentation ranging signals, such as from the GPS are received by the GPS front end 828. The GPS front end 828 includes one or more band pass filters 832 and an LNA 834. Additional, different or fewer components may be provided. Three connectors of the front end 803, 828 are provided at 838, 842 and 844. The connector at 844 is operable to receive code from the back end 805. A diplexer 840 allows the connector 842 to include both a DC power signal from the back end 805 as well as the decorrelated ranging signals from the front end 803 for transmission to the back end 805. The diplexer 836 separates the GPS ranging signals as well as a 10 MHz or other frequency reference signal to be output or input on the same connector 838. Other distributions or separations of the local positioning ranging signals, augmentation ranging signals, power, reference frequency, and coding may be used.

The back end 805, 892 includes connectors 846, 848, 850, diplexers 856 and 854, an amplifier 858, a mixer 860, an oscillator 861, a filter 862, an analog-to-digital converter 864, a processor 866, a frequency multiplier 868 and a processor 870. Additional, different or fewer components may be provided, such as separating the local positioning signal path into in phase and quadrature paths.

In the back end 805, 892, any augmentation ranging signals, such as GPS signals are provided on the connector 846. The diplexer 856 separates the 10 MHz or other reference frequency signal output to the front end 803 from the augmentation ranging signals received.

The local positioning ranging signals are input on the connector 848. The diplexer 854 splits the local positioning ranging signals from a DC or other power signal output to the front end 803. The amplifier 858 amplifies the ranging signals to counteract any attenuation between the front end 803 and the back end 805. The amplified signals are further mixed by the mixer 860, such as an analog balanced mixer. In response to the oscillator 861, such as a voltage controlled oscillator outputting a 160 MHz signal, the mixer 860 further down converts the ranging signals. The filter 862, such as a band pass filter at 15 MHz with a 2 MHz bandwidth, filters the down converted signals. The analog-to-digital converter 864 provides digital information to the processor 866. The analog-to-digital converter 864 may be positioned elsewhere within the signal path, such as prior to the mixer 860. The processor 866 is operable to generate a pseudo-random noise code for decorrelation by the mixer 818. The processor 866 is also operable to correlate the ranging signals with the code and accumulate information to determine a range. The processor 870 is an ASIC, control processor, general processor, FPGA, or other processing device or circuit. The processor 870 controls functions of the processor 866 and determines position based on range measurement from the processor 866. The frequency multiplier 868 multiplies a reference frequency, such as a 10 MHz reference frequency for use by the processor 866. In one embodiment, the multiplier outputs an 80 MHz signal.

Figure 10:
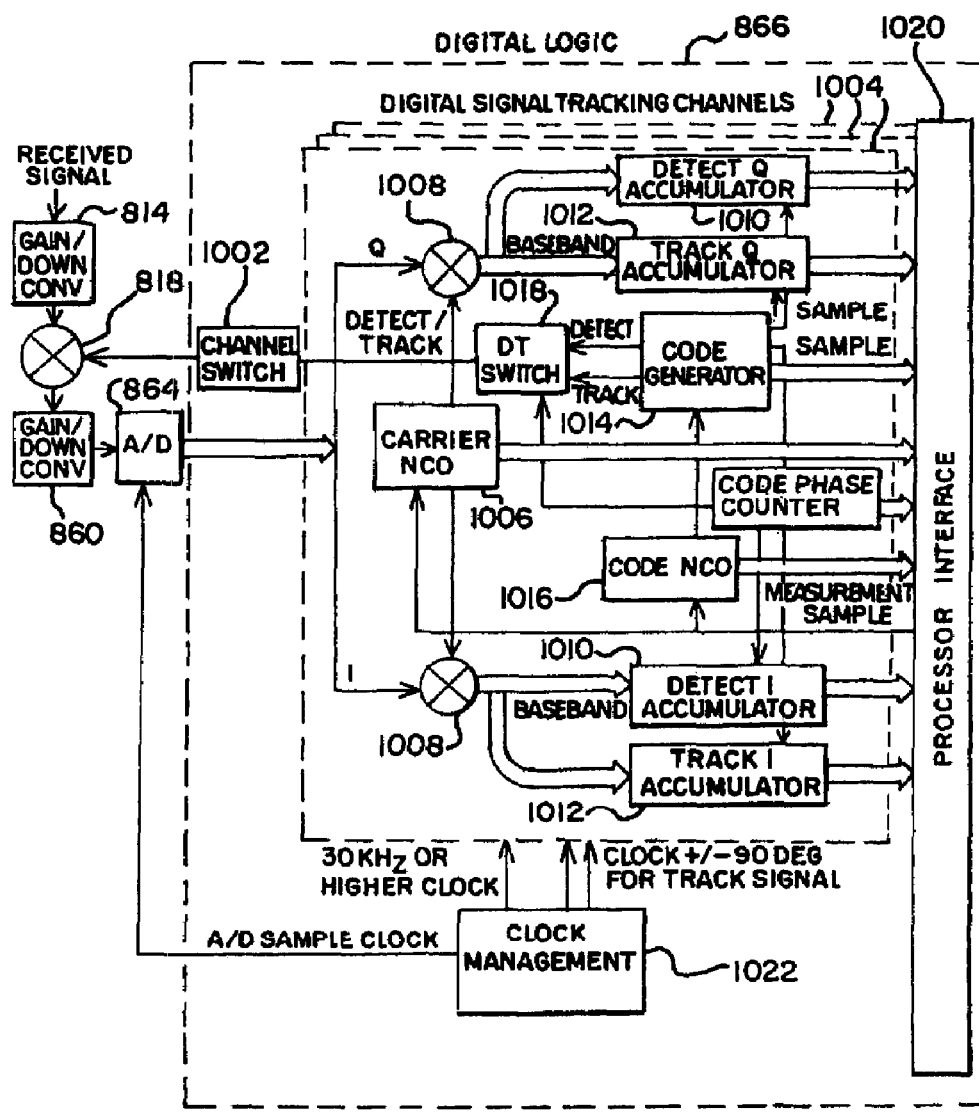
FIG. 10 is a block diagram of one embodiment of digital logic implemented in a receiver.

The local positioning signal path 804 includes both analog decorrelation as well as remote down conversion. Either of these features may be used independently of each other. FIGS. 8, 9 and 10 show aspects of the analog decorrelation incorporated within the path 804 described in FIG. 18. Particular components of the local positioning path 804 are included in FIGS. 8, 9 and 10 for discussion purposes. Additional components, such as the components described with respect to FIG. 18, may additionally be included.

In FIG. 8, the mixer 818 is shown as part of the microwave radio frequency front end 803 to indicate analog decorrelation. The analog-to-digital converter 864 is shown after the front end 803 to show conversion of the ranging signals information to a digital form for use in or by the back end 805. The analog decorrelation is performed for the direct sequence, spread spectrum ranging signals broadcast from different transmitters in different time slots. By using analog decorrelation, more reasonable analog-to-digital sampling may be allowed. Broad bandwidth filtering may more readily be provided with analog components. Digital switching at the X-band or other carrier or intermediate frequencies may be avoided. The analog mixer 818 connects with the antenna 806 and is operable to mix signals received by the antenna 806 with each of a plurality of replica spread spectrum codes.

Different replica spread spectrum codes are provided to the analog mixer for decorrelation of the TDMA ranging signals. For example, the TDMA sequences shown in FIG. 3 or 4 are used. Two successive codes from a same transmitter are decorrelated by the same analog balance mixer to produce the detection and tracking codes in series. As shown in FIG. 10, a channel switch 1002 switches between different codes for different transmitters 16. By providing different codes to the mixer 818 at different times, time division multiplexing scheme is implemented for tracking the codes from different transmitters 16. The channel switch 1002 includes a counter and multiplexer to switch the codes after a desired amount of time or for each time slot.

Using the TDMA sequence as shown in FIG. 3 or 4, two different unique codes are received within one or two time slots. One code indicates a time period for accumulating a prompt detection measurement and another early-minus-late code is for a tracking measurement. The channel switch 1002 switches between the plurality of replica spread spectrum codes within the repeat interval.

After conversion to digital signals, the decorrelated ranging information is provided to the processor 866. In one embodiment, the processor 866 is a field programmable gate array, but a general processor, digital signal processor, ASIC, analog circuit, digital circuit and/or combinations thereof may be used. The processor 866 is operable in a plurality of different channels 1004. A digital channel 1004 is provided for each of the time slots and corresponding transmitted codes. A same digital channel 1004 is operable to receive different codes associated with the same transmitter 16. In alternative embodiments, one or more digital channels 1004 correspond to a plurality of transmitters 16 and are reprogrammed for operation with the different codes. Digital signals from the analog-to-digital converter 864 are provided to the digital channel 1004 appropriate for the code output by the channel switch 1002. During its allotted time slot, the intermediate frequency signals are received from the analog-to-digital converter by the particular digital channel 1004.

The intermediate frequency signals are demodulated to base band by a numerically controlled oscillator 1006 using two mixers 1008, one for a quadrature signal and another for in-phase signal. Numerically controlled oscillator 1006 is implemented as a counter and is ongoing for each of the digital channels 1004 whether selected or not selected. A separate numerically controlled oscillator 1006 is provided for each digital channel 1004. The ramp phase of the code generated is the same as the receive signal. The counter is incremented to match the code phase of the received ranging signal.

The resulting base band signal is detected by two sets of accumulators 1010, 1012. One set of accumulators integrates the base band samples over the time period when a detection code is generated and mixed with the incoming signal. Another set of accumulators 1012 integrates base band signals over a time period when a tracking replica code is generated and mixed with the incoming signal. In alternative embodiments, a single accumulator, one accumulator for each in-phase or quadrature portion of the receiver or other numbers of accumulators may be used. The tracking replica code may be generated as the binary difference between two replica codes that are one-half chip earlier and one-half chip later than the prompt code. The prompt code is generated at a modulation rate of 30 MHz, or 200 MHz or higher by the clock management circuit 1022.

The accumulation of samples is controlled by the code generator 1014. The code generator 1014 generates replica code appropriate for a given channel from a linear feedback shift register (LFSR), such as a maximal length LFSR, a Gold, Kasami, or any other code generator, or the code is read directly from a memory. The code is generated in response to a numerically controlled oscillator 1016. A switch 1018 switches between the prompt and tracking codes for providing coding information to the analog mixer 818. Alternatively, the code generator 1014 generates the appropriate codes at the appropriate time without the use of the switch 1018. The tracking code is generated at the same rate as the prompt code, but may be plus or minus 90 degrees out of phase with the prompt code. The clock for the tracking code sequence is also generated by the clock management circuit 1022. By taking the difference between codes shifted by plus and minus half a chip, which is plus and minus 90 degrees of the high rate clock, an early-minus-late tracking code is generated. The early-minus-late tracking code provides an error signal for tracking algorithms in the processor 880.

The accumulated samples and the counts of the oscillators of the carrier and code are output through a microprocessor interface 1020 to a microprocessor 880. In an embodiment shown in FIG. 8, the processor 880 receives signals from both the LPS signal path 804 and a GNSS signal path 802. In the alternative embodiment shown in FIG. 9, the processor 880 is distributed as a GPS or GNSS navigation processor in a GNSS receiver 902 and a different processor for the local positioning system. The GNSS receiver 902 is a dual frequency GPS real time kinematic receiver, but other GNSS system receivers may be used. The processor 880 provided as part of the local positioning path of receiver 904 implements the signal phase tracking pursuant to the signal phase tracking program. The phase information is provided to the processor 880 implemented as part of the GNSS receiver for determining position. An auxiliary communications channel 930 from the processor 880 of the GNSS receiver 902 receives information from the processor 880 of the local positioning receiver 904, such as phase measurement information and also provides control instructions to the local positioning receiver 904. The auxiliary communications 930 is an RS232 or 422 serial port, a universe serial bus (USB), firewire, Ethernet, parallel data port, or any other such digital data channel. The processor 880 controls sub-millisecond interrupts to manage phase tracking. Alternatively, two distinct phase tracking units have digital signal processors application specific integrated circuits or other processors to manage signal phase tracking while a primary processor collects phase measurements from each and computes the position solutions. Alternatively, the processor 880 is located in one of the two receivers 902, 904 and information is communicated from one receiver to the other.

The processor 880 reads the accumulated base band samples for the tracking replica codes. A control signal feedback to the carrier and code numerically controlled oscillators 1006 and 1016 maintains tracking of the incoming signals. The phase of the code and carrier numerically controlled oscillators 1006 and 1016 may be sampled at regular intervals and read by the processor 880. The phases correspond to a measurement of the time of flight of the signal from each transmitter 16 to the receiver 800, 900. The processor 880 computes a position based on the ranging signal information received from a plurality of transmitters. The position is determined as a function of four or more ranges and associated output information from each of the respective digital channels 1004. The processor initiates tracking as a function of the prompt code and maintains tracking as a function of the tracking code. The carrier signal is tracked with a phase-locked loop to maintain signal tracking. The instantaneous value of the code and carrier NCOs provide the range measurements.

FIGS. 8 and 9 show receivers 800, 900 which augment position determinations from the local positioning system with ranging information from a GNSS. Two different methods for measuring ranging signals are provided. One from GNSS and another from a territorially based augmentation or local system. GNSS are designed for operation over thousands of kilometers. The local positioning system is designed as discussed above for use in smaller regions of operation, such as a few meters to tens of kilometers. To gain the combined benefit of both GNSS and the local positioning system, the receiver 800, 900 is operable to measure ranges using the two different methodologies. The information is then combined to form a position solution.

The receivers 800, 900 are connected with both the microwave antenna 806 and the GNSS antenna 808. The GNSS antenna 808 may correspond to a plurality of antennas, such as for receiving L1, L2 and/or L5 frequencies or receiving from different satellites. In one embodiment, the phase centers of the two different antennas 806, 808 are co-located, such as aligned along at least one dimension. In alternative embodiments, the antennas 806, 808 are spaced apart from each other. The receivers 800, 900 are operable to determine a position as a function of ranging signals from both the GNSS antenna 808 and the microwave antenna 806. As a further enhancement, the receivers 800, 900 are operable to determine a differentially corrected position as a function of the signals and received phase measurements from the reference station 18. Alternatively or additionally, the receivers 800, 900 output phase measurement information as a differential station 18 for use by another receiver 22.

The GNSS signal path 802 or receiver 902 measures a range from ranging signals received from the satellite 12. Ranges may be determined from a plurality of different satellites 12. Amplification and filtering is provided by the GNSS radio frequency front end 828. An analog-to-digital converter 890 converts the signals to a digital format. A GNSS back end 892 performs digital decorrelation. A code generator generates the GNSS code for mixing. A digital mixer mixes the code generated with the received ranging signals. Code phase information may be used for determining a code base position. A carrier phase is optionally measured for real time kinematic position determination with sub-meter accuracy. In one embodiment, each of the back ends 892 of the GNSS signal path 802 or receiver 902 includes separate carrier and code mixers and associated accumulators. By measuring code and/or carrier phase information from at least five or more satellites, centimeter level accuracy position determination may be provided given relative movement and differential measurements. Code measurement of a GPS signal may achieve several meters of accuracy. Real time kinematic measurement of GPS signals achieves sub-meter or centimeter accuracy using carrier measurements. L1, L1 and L2, L5, combinations thereof or other techniques may be used for determining ranges and associated position information from satellites.

The local positioning receiver 904 and corresponding signal path 805 measures one or more ranges from ranging signals from one or more land-based transmitters. Using the signal structure described above with respect to FIG. 2, a code phase range and position accuracy better than one wavelength of a carrier of the GNSS signals, such as centimeter accuracy, is provided. After analog-to-digital conversion, the back end 805 generates phase measurements for determining a range and/or position.

The two distinct ranging methods and associated receivers provide phase measurement information to the processor 880. The processor 880 determines a position from the measurements from both the GNSS receiver 902 and the local positioning system receiver 904. The position information may be further refined using real time kinematic measurement of the GNSS signals. The signals are responsive to analog and digital decorrelation. The processor 880 uses the ranging measurements to calculate a position solution for any combination of four or more ranging signals.

Augmentation using a local positioning system and a GNSS system may be more accurate than either ranging system alone. In one embodiment, two different positions are calculated using the two different methods. An average position is then determined from the two methods. Alternatively, one of the methods, such as the local positioning system position determination, identifies a position used as long as the other method, such as the GNSS position determination, identifies a position within a threshold amount. In an alternative embodiment, the positioning algorithm is implemented as a single method that handles any of various combinations of satellites 12 and transmitters 16. Depending on a given position within a region of operation, the mobile receiver 22 may have access to a different numbers of satellites 12 and land-based transmitters 16. By using the available information simultaneously, a more accurate position determination may result, such as through more optimal dilution of precision.

Figure 12:
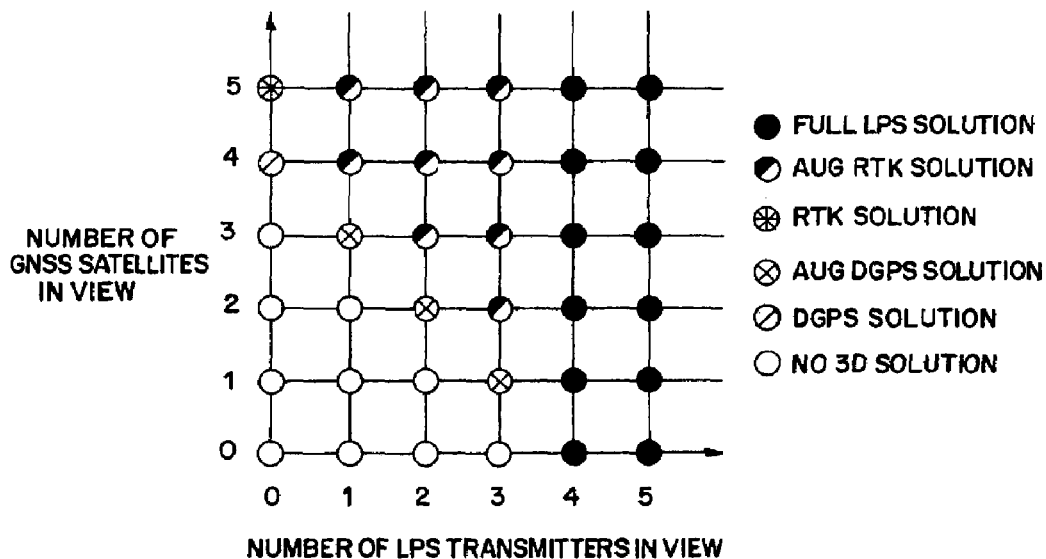
FIG. 12 is a graphical representation of one embodiment of position solutions based on a number of available satellites and land-based transmitters.
Figure 13:
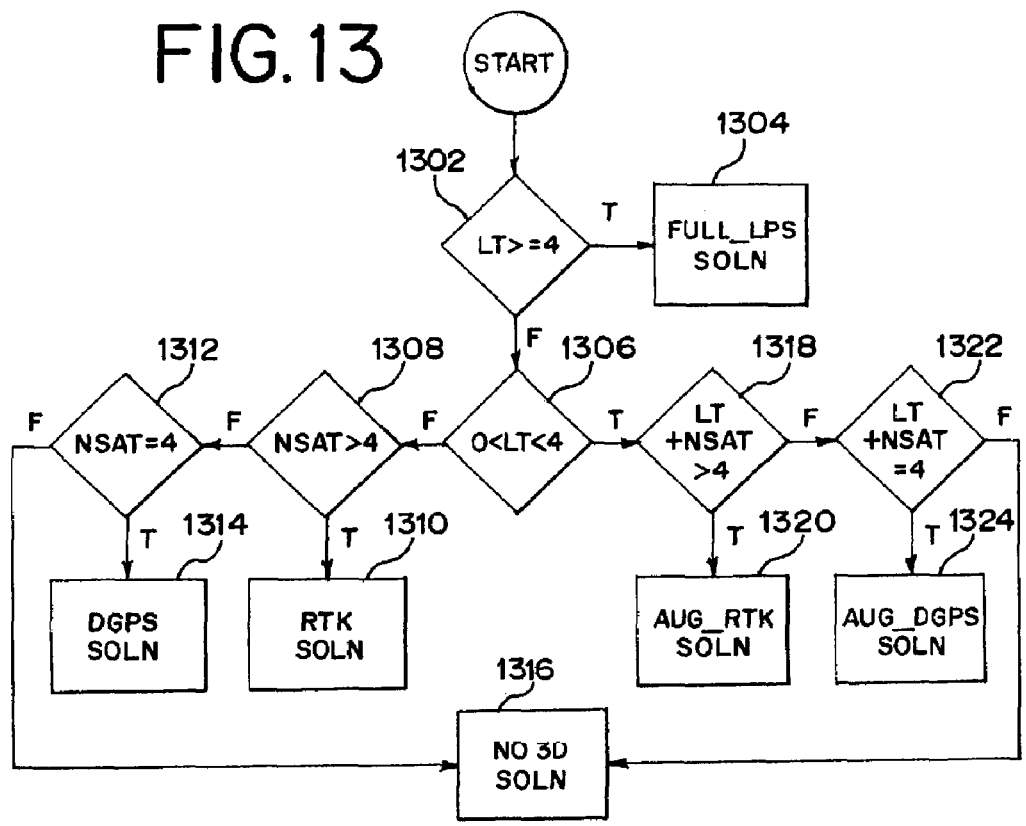
FIG. 13 is a flow chart of one embodiment of a method of solving for a position using local positioning and a GNSS.

FIG. 12 is a graphical representation of the different processing used depending on a number of available range measurements from satellites 12 and from land-based transmitters 16. FIG. 13 is a flow chart indicating an order of preference used for different solutions shown in FIG. 12 for determining position from ranging information. Additional, different or fewer acts may be provided in alternative embodiments. The criteria for numbers of satellites and/or land transmitters in FIG. 13 are based on two assumptions: (1) the land transmitters and satellites are synchronized, either directly or indirectly, and (2) any cycle ambiguity on satellites is performed with at least one redundant signal to assure integrity of the result. If the land transmitters and satellites are not synchronized, a minimum of two satellites and two land transmitters are needed for each of the Augmented RTK 1320 and Augmented DGPS 1324 solutions, due to observability needed for two time biases. If cycle ambiguity on satellites is performed without a redundant signal for integrity check, then one fewer satellite is needed for the RTK 1310 and Augmented RTK 1320 solutions.

In act 1302, the number of land-based transmitters is examined. If the number of ranging signals from land-based transmitters is greater than or equal to 4, the position solution is determined using the local positioning system in act 1304. Using a greater number of ranging measurements to determine position may provide a more optimum dilution of precision. A more optimum dilution of precision results in a greater position accuracy. Using the full local positioning system solution, a highly accurate solution may be provided regardless of satellite availability. Centimeter level accuracy is provided using the code phase of the ranging signals discussed above with respect to FIG. 2. Since the accuracy of each of the ranging signals from land-based transmitters is better than one wavelength of a GPS or GNSS carrier and unambiguous over the region of operation, a position solution substantially equal to the accuracy or better than the accuracy of a real time kinematic GPS may be performed from phase measurements taken within a single time sample. Relative motion is not needed to resolve any ambiguity. The code phase noise is substantially equal to the carrier phase noise of a satellite signal, and the code phase does not have ambiguity over the region of operation. The code phase measurement for a single LPS transmitter is:

$$\phi_j^t = |q_j - x| + (1 - \phi_j^{rt})\tau^t + v_j^t \qquad \text{Equation (1)}$$

where x is the desired, unknown position of the user, $\phi_j^t$ is the code phase measured from local transmitter j, characterized by code phase noise $v_j^t$. $\phi_j^{rt}$ is the code phase rate, $q_j$ is the position of local transmitter j, and $\tau^t$ is the time offset of a mobile receiver with respect to a clock, which may or may not be synchronized to the GPS. All parameters are in a common unit of measure.

One way to find a solution to a set of measurements in the form of equation (1) is to linearize the measurements about an initial estimate, but other methods may be used. Linearizing (1) about an estimate of the position $\hat{x}$ gives:

$$\delta\phi_j^t = -\bar{e}_j^T \delta x + \left(1 - \dot{\phi}_j^{rt}\right)\tau^t + v_j^t \qquad \text{Equation (2)}$$

where, $$\bar{e}_j^T \equiv \frac{[q_j - \hat{x}_i]^T}{|q_j - \hat{x}_i|} \qquad \text{Equation (3)}$$

If there are $n_t$ LPS transmitters in track, the measurements may be combined in matrix form:

$$\begin{bmatrix} \delta\phi_1^t \\ \vdots \\ \delta\phi_{n_t}^t \end{bmatrix} = \begin{bmatrix} -e_1^T & 1-\dot{\phi}_1^{rt} \\ \vdots & \vdots \\ -e_{n_t}^T & 1-\dot{\phi}_{n_t}^{rt} \end{bmatrix} \begin{bmatrix} \delta x \\ \tau^t \end{bmatrix} + \begin{bmatrix} v_1^t \\ \vdots \\ v_{n_t}^t \end{bmatrix} \qquad \text{Equation (4)}$$

when $n_t \geq 4$, and the measurements are linearly independent (i.e., adequate DOP), the equations may be solved to derive the position using a linear least squares fit. If the code phase noise is a zero-mean Gaussian with standard deviation of 3 cm, then the resulting position solution may have an accuracy of 3 cm for DOP values of 1. The system of equations (4) may be solved using a single epoch of measurements when $n_t \geq 4$. To solve the system of equations, an initial estimate of $\hat{x}$ is entered, the linear least-squares method is applied to compute $\delta\hat{x}$, the new value of $\delta\hat{x}$ is entered for $\hat{x}$, and the process is repeated until the residual is negligible.

To improve the dilution of precision, range information from satellites 12 may be included. The integer ambiguity of the carrier phase of signals from the satellites 12 is resolved using the local positioning system determined position. Since the location is known to within one wavelength of the highest GNSS carrier frequency, the integer ambiguity is resolved. The position estimate may then be refined as a function of ranging signals from the satellites 12 and the local positioning based resolution of integer ambiguity of the carrier phase of the satellite ranging signals. Satellite carrier phase measurements are included in subsequent processing, providing a robust and improved dilution of precision using both satellite and local positioning system ranging signals. If one or more local positioning ranging signals are lost, such as due to movement of the mobile receiver 22, the previous resolution of the carrier cycle ambiguity may allow for more accurate and faster position determination using satellite ranging signals without having to further solve again the carrier cycle ambiguity.

In act 1306, the number of land-based transmitters 16 and associated ranging signals is compared to 0 and 4 level thresholds. If greater than 0 but less than 4 land-based transmitters are available, the procedure proceeds to act 1318. However, if ranging signals from land-based transmitters are unavailable, the process proceeds to a satellite 12 or GNSS based solution in act 1308. In act 1308, the number of available satellites and associated ranging signals is compared to a threshold. If the number is greater than 4, then a real time kinematic solution is performed in act 1310.

In act 1310, conventional real time kinematic GPS algorithms are implemented. Later developed algorithms may be used. Real time kinematic GPS algorithms provide centimeter accurate solutions after a period of a few minutes. Faster or slower processing may be provided. The real time kinematic solution provides positioning based on both code and carrier phase information. The carrier phase measurements from a single GPS satellite may be expressed as:

$$\psi_{ik}^s = -e_{ik}^T x_k + (1-\psi_{ik}^{rs})\tau_k^s + N_i + w_{ik}^s \qquad \text{Equation (5)}$$

where $\psi_{ik}^s$ is the differential carrier phase measured from satellite i, characterized by carrier phase noise $w_{ik}^s$. $\psi_{ik}^{rs}$ is the carrier phase rate, and $N_i$ is the carrier integer cycle ambiguity. The index k is a sample epoch index in the carrier phase measurement variables, since samples are taken over several epochs to solve the carrier integer cycle ambiguity. For consistency of notation in the following discussion, the satellite observations of equations (5, 6, 7 and 8) are written in partial differential form, even though they are already linear equations. If there are $n_s$ satellites in track, the measurements may be combined in matrix form:

$$\begin{bmatrix} \psi_{1k}^s \\ \vdots \\ \psi_{n_s k}^s \end{bmatrix} = \begin{bmatrix} -e_1^T & 1-\dot{\psi}_1^{rt} \\ \vdots & \vdots \\ -e_{n_s k}^T & 1-\dot{\psi}_{n_t}^{rt} \end{bmatrix} \begin{bmatrix} x_k \\ \tau_k^s \end{bmatrix} + \begin{bmatrix} N_1^s \\ \vdots \\ N_{n_s}^s \end{bmatrix} + \begin{bmatrix} w_{1k}^s \\ \vdots \\ w_{n_s k}^s \end{bmatrix} \quad \text{Equation (6)}$$

If the cycle ambiguities are known, a set of four of these measurements are solved for position. However, in the initial case, a receiver tracks five or more satellites ($n_s \geq 5$) to solve the cycle ambiguity equations with a minimum integrity check, and these five or more measurements are made over several sample epochs (k) as satellites move. The several epochs of measurements may be solved using an iterated information smoother or other solution. For typical carrier phase noise of two centimeters, the resulting position solution may have accuracy of two centimeters for DOP values of 1.

The above description features GPS L1 measurements. The receiver may track L2 and/or L5 carrier phase in addition to enhance the cycle ambiguity process. One such receiver is described in U.S. Pat. Nos. 6,570,534 B2 and 6,762,714 B2, the disclosures of which are incorporated herein by reference.

When the number of available ranging signals and satellites 12 is equal to 4 as represented in act 1312, a differential GPS or GNSS solution is performed in act 1314. Differential GPS may provide an accuracy of only several meters. Differential GPS relies on code phase measurements of the satellite based ranging signals. The differential code phase measurement from a single GPS satellite may be expressed as:

$$\phi_i^s = -e_i^T x + (1-\dot{\phi}_i^{rs})\tau^s + v_i^s \quad \text{Equation (7)}$$

where $\phi_i^s$ is the differential code phase measured from satellite i, characterized by code phase noise $v_i^s$. $e_i^T$ is the line of sight vector from user to satellite i, x is the user receiver position, $\dot{\phi}_i^{rs}$ is the code phase rate from satellite i, and $\tau^s$ is the time offset of user receiver with respect to GPS time. If there are $n_s$ satellites in track, the measurements may be combined in matrix form:

$$\begin{bmatrix} \phi_1^s \\ \vdots \\ \phi_{n_s}^s \end{bmatrix} = \begin{bmatrix} -e_1^T & 1-\dot{\phi}_1^{rs} \\ \vdots & \vdots \\ -e_{n_s}^T & 1-\dot{\phi}_{n_s}^{rs} \end{bmatrix} \begin{bmatrix} x \\ \tau^s \end{bmatrix} + \begin{bmatrix} v_1^s \\ \vdots \\ v_{n_s}^s \end{bmatrix} \quad \text{Equation (8)}$$

When $n_s \geq 4$, and the measurements are linearly independent (i.e. adequate DOP), the equations are solved to derive the position using a linear least squares fit. If the code phase noise is treated as a zero-mean Gaussian with standard deviation of a few meters, which is typical, then the resulting position solution has an accuracy of a few meters for DOP values of 1. Code phase noise is often not zero-mean Gaussian due to multipath, so a lesser accuracy may result.

If no ranging signals from land-based transmitters and fewer than 4 ranging signals from satellites 12 are available, no three-dimensional position solution is provided in act 1316. In alternative embodiments, a two- or three-dimensional position solution is attempted given other known information, such as use of known terrain model, use of an ultra stable oscillator, or placement within a particular region of operation. For example, 3 ranging signals may indicate a three-dimensional position if the mobile receiver is known to be constrained to a certain vertical height above the ground, and the altitude of the ground is known by some terrain model.

In act 1318, less than four land-based transmitters and corresponding ranging signals are available, but a total number of satellites 12 and land-based transmitters 16 and corresponding ranging signals greater than 4 are available. As represented in FIG. 12, ranging signals from at least two satellites and at least one land-based transmitter are measured. The total number of ranging signals is at least 5. Using both satellite and land-based transmitter ranging signals in act 1320 allows for an augmented real-time kinematic solution to form centimeter accurate solutions with fewer than five satellites. When five or more satellites are available and at least one land-based transmitter is available, the augmented real-time kinematic solution converges to a centimeter accurate solution faster than a conventional real time kinematic GNSS solution of an equivalent dilution of precision because the sub-GNSS wavelength accuracy of the at least one land-based transmitter signal constrains the solution in at least one dimension.

The carrier phases from GPS satellites may be combined with the code phases from land-based transmitters to form a position when either or both of the number of satellites and land-based transmitters are insufficient to solve for position and GPS carrier cycle ambiguities, i.e. ($n_s < 5$ or $n_t < 4$). For the situation in which the local positioning system is synchronous with GPS, an additional condition is $n_s + n_t \geq 5$. If the local positioning system is asynchronous with GPS, an additional condition is $n_s + n_t \geq 6$ because there is an extra time variable for which to solve. Since the satellite carrier phases are collected over several sample epochs to resolve cycle ambiguities, the code phase also includes multiple epochs for local positioning system code phases, hence the addition of sample index k to the local code phases.

The following matrix equation shows how to combine satellite carrier phases with local code phases for the asynchronous case:

$$\begin{bmatrix} \delta\psi_{1k}^s \\ \vdots \\ \delta\psi_{n_s}^s \\ \delta\psi_{1k}^t \\ \vdots \\ \delta\phi_{n_t}^t \end{bmatrix} = \begin{bmatrix} -e_1^T & 1-\dot{\phi}_1^{rs} & 0 \\ \vdots & \vdots & \vdots \\ -e_{n_s}^T & 1-\dot{\phi}_{n_s}^{rs} & 0 \\ -\bar{e}_1^T & 0 & 1-\dot{\phi}_1^{rt} \\ \vdots & \vdots & \vdots \\ -\bar{e}_{n_t}^T & 0 & 1-\dot{\phi}_{n_t}^{rt} \end{bmatrix} \begin{bmatrix} \delta x \\ \tau^s \\ \tau^t \end{bmatrix} + \begin{bmatrix} N_1^s \\ \vdots \\ N_{n_s}^s \\ 0 \\ \vdots \\ 0 \end{bmatrix} + \begin{bmatrix} w_{1k}^s \\ \vdots \\ w_{n_s k}^s \\ v_1^t \\ \vdots \\ v_{n_t}^t \end{bmatrix} \quad \text{Equation (9)}$$

If the LPS is synchronized with GPS, $\tau^t = \tau^s$, the above matrix equation becomes:

$$\begin{bmatrix} \delta\psi_{1k}^s \\ \vdots \\ \delta\psi_{n_s}^s \\ \delta\phi_{1k}^t \\ \vdots \\ \delta\phi_{n_t}^t \end{bmatrix} = \begin{bmatrix} -e_1^T & 1-\dot{\phi}_1^{rs} \\ \vdots & \vdots \\ -e_{n_s}^T & 1-\dot{\phi}_{n_s}^{rs} \\ -\bar{e}_1^T & 1-\dot{\phi}_1^{rs} \\ \vdots & \vdots \\ -\bar{e}_{n_t}^T & 1-\dot{\phi}_{n_t}^{rs} \end{bmatrix} \begin{bmatrix} \delta x \\ \tau^s \end{bmatrix} + \begin{bmatrix} N_1^s \\ \vdots \\ N_{n_s}^s \\ 0 \\ \vdots \\ 0 \end{bmatrix} + \begin{bmatrix} w_{1k}^s \\ \vdots \\ w_{n_s k}^s \\ v_1^t \\ \vdots \\ v_{n_t}^t \end{bmatrix} \quad \text{Equation (10)}$$

As with the real time kinematic GPS solution, the several epochs of measurements in the systems of equations (9) and (10) may be solved using an iterated information smoother or other solution. For typical carrier phase noise of 2 cm and worst case local code phase noise of about 3 cm, the resulting position solution may have accuracy of 2-3 cm for DOP values of 1. Each local code phase measurement that is added to the system of equations (9) or (10) narrows the search space of the satellite carrier phase cycle ambiguity, thereby reducing the convergence time for solving the cycle ambiguities. The above description may be generalized to include GPS L2 carrier or L5 code and carrier, Galileo or GLONASS phase measurements as well to enhance the cycle ambiguity resolution. process.

Returning to act 1304, whenever $n_t \geq 4$ land-based transmitters are tracked, the position x may be solved without any information from the satellites. In the context of equations (9) and/or (10), this position solution can be used to "back out" the cycle ambiguities for any satellites in track by entering the x into the system of equations (9) or (10) and solving for N in a single sample epoch.

If the number of ranging signals from land-based transmitters 16 and satellites 12 is equal to 4 where at least one and less than 4 land-based transmitter ranging signals are available, act 1322 shows the use of an augmented differential GPS solution in act 1324. For the augmented differential GPS solution, fewer than 4 satellites are available. Because the accuracy of at least one ranging signal from a land-based transmitter is better than one wavelength of the GPS carrier, the accuracy of the augmented differential GPS solution may be more accurate than a conventional differential GPS solution of the same dilution of precision. As shown in FIG. 12, at least one and fewer than four satellite ranging signals are measured.

The code phases from GPS satellites may be combined with the code phases from land-based transmitters to form a position when either or both of the number of satellites and LPS transmitters are insufficient to solve for position, i.e. ($n_s \geq 4$ or $n_t \geq 4$). For the situation in which the local positioning system is synchronous with the GPS, an additional condition is $n_s + n_t \geq 4$. If the local positioning system is asynchronous with the GPS, an additional condition is $n_s + n_t \geq 5$. The following matrix equation shows how to combine satellite code phases with local code phases for the asynchronous case:

$$\begin{bmatrix} \delta\phi_1^s \\ \vdots \\ \delta\phi_{n_s}^s \\ \delta\phi_1^t \\ \vdots \\ \delta\phi_{n_t}^t \end{bmatrix} = \begin{bmatrix} -e_1^T & 1-\dot{\phi}_1^{rs} & 0 \\ \vdots & \vdots & \vdots \\ -e_{n_s}^T & 1-\dot{\phi}_{n_s}^{rs} & 0 \\ -\bar{e}_1^T & 0 & 1-\dot{\phi}_1^{rt} \\ \vdots & \vdots & \vdots \\ -\bar{e}_{n_t}^T & 0 & 1-\dot{\phi}_{n_t}^{rt} \end{bmatrix} \begin{bmatrix} \delta x \\ \tau^s \\ \tau^t \end{bmatrix} + \begin{bmatrix} v_1^s \\ \vdots \\ v_{n_s}^s \\ v_1^t \\ \vdots \\ v_{n_t}^t \end{bmatrix} \quad \text{Equation (11)}$$

If the LPS is synchronized with GPS, $\tau^t = \tau^s$, the above matrix equation becomes:

$$\begin{bmatrix} \delta\phi_1^s \\ \vdots \\ \delta\phi_{n_s}^s \\ \delta\phi_1^t \\ \vdots \\ \delta\phi_{n_t}^t \end{bmatrix} = \begin{bmatrix} -e_1^T & 1-\dot{\phi}_1^{rs} \\ \vdots & \vdots \\ -e_{n_s}^T & 1-\dot{\phi}_{n_s}^{rs} \\ -\bar{e}_1^T & 0 \\ \vdots & \vdots \\ -\bar{e}_{n_t}^T & 0 \end{bmatrix} \begin{bmatrix} \delta x \\ \tau^s \end{bmatrix} + \begin{bmatrix} v_1^s \\ \vdots \\ v_{n_s}^s \\ v_1^t \\ \vdots \\ v_{n_t}^t \end{bmatrix} \quad \text{Equation (12)}$$

The system of equations (12) may be solved by the same method used to solve the system of equations (4).

Since the noise for any given local code phase measurement is much smaller than the noise for any given satellite code phase measurement, as is evident in the measurement noise vector $[v_1^s \ldots v_{n_s}^s \; v_1^t \ldots v_{n_t}^t]^T$, the position solution from the combined system is more accurate than a solution derived solely from satellite code phase measurements for equivalent DOP.

When the total number of ranging signals from both land-based transmitter 16 and satellites 12 is less 4, then no three-dimensional solution is provided in act 1316. Other algorithms for determining position based on lesser information may be used. In yet other alternative embodiments, different algorithms and associated equations are used for combining information from both satellite and land-based ranging signals.

Figure 11:
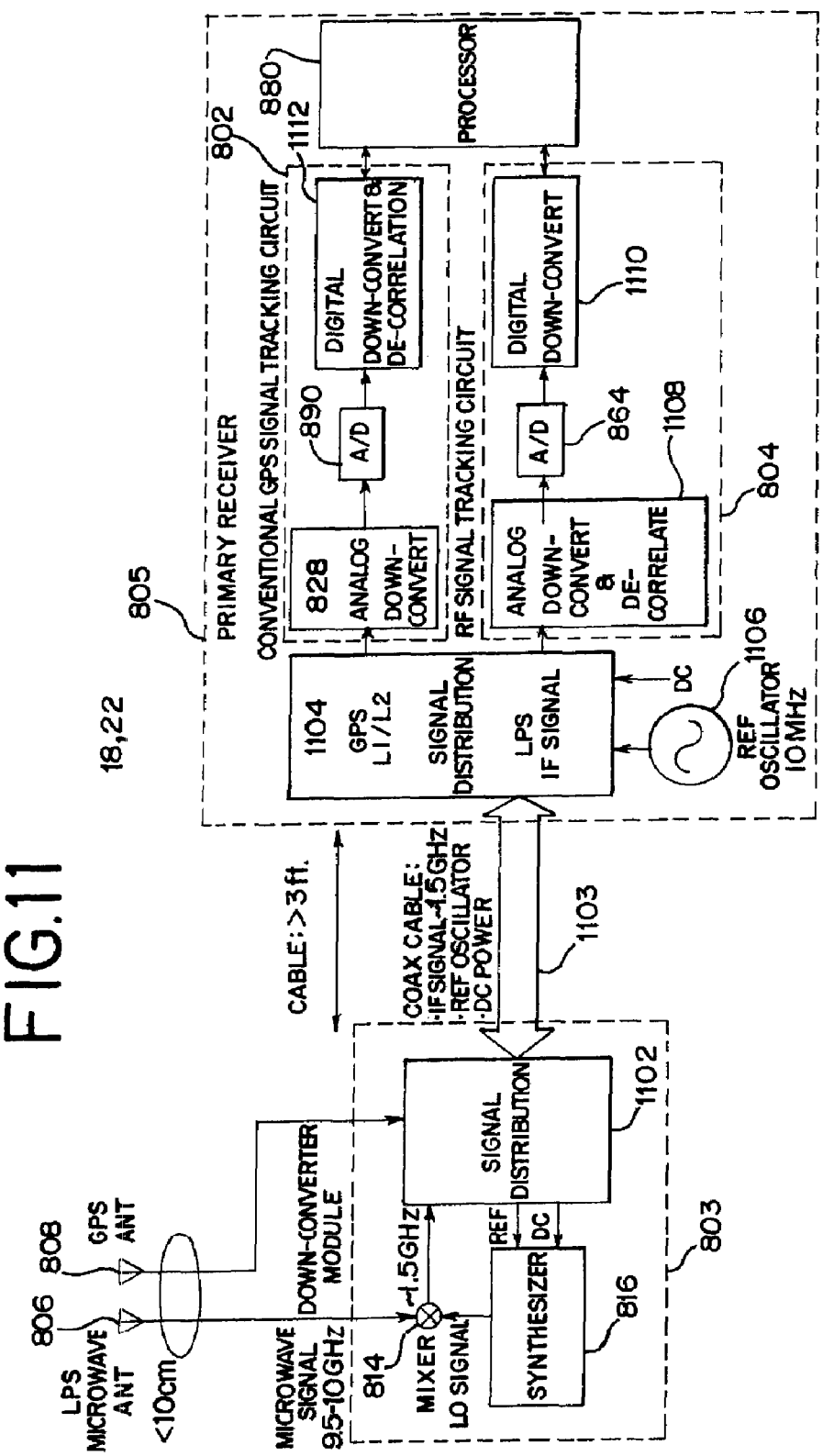
FIG. 11 is a block diagram of one embodiment of a receiver with a separated or remote down converter module.

The receiver 800 for implementing position measurements may be used in various environments. FIG. 11 shows one embodiment of the receiver 800. FIG. 18 shows a specific implementation of the distributed radio frequency receiver of FIG. 11. The receiver is distributed amongst two or more different remote locations. For example, the front end 803 is provided at one location and the back end 805 is provided at another location. The antennas 806 and 808 may be positioned in a location a relatively long distance away from the receivers 18, 22. For example, the antennas 806 and 808 are positioned on the top of a cab of mobile equipment or on the top of a tower, and their associated receiver is located within the cab or on the ground for maintenance access. The separation between the antennas 806, 808 and receiver 18, 22 may be tens of meters in distance. A long coaxial cable connects the antennas 806, 808 to the receivers 18, 22. However, signal attenuation may be significant. While a low noise amplifier may boost the signal before being sent on a cable to the receiver 18, 22, attenuation of higher frequencies may still result. The signal loss in a coaxial cable is logarithmically related to the frequency, so higher frequency signals have worse attenuation. X-band or ISM-band ranging signals for the local positioning system may result in greater attenuation than GNSS signals. In one embodiment, the LNA gain is increased to overcome attenuation. In another embodiment represented in FIGS. 11 and 18, the local positioning ranging signals are down converted near the antenna, such as on the front end 803, to a lower intermediate frequency signal. The intermediate frequency signal has a better attenuation when transmitted over a cable 1103 to the back end 805, providing a stronger signal to the receiver 18, 22. Other implementations are possible. While the receiver 800 includes both GNSS and local positioning signal paths 804, 802, only one of the two paths may be provided in alternative embodiments.

A portion of the receiver 18, 22 is spaced from the down converter or mixer 814. For example, the front end 803 is spaced at least a meter from the back end 805. The front end 803 is close to the antenna 806, such as within a meter. The distance between the front end 803 and the microwave antenna 806 is less than the distance between the front end 803 and the back end 805. A reference frequency output by the oscillator 1106 as well as a power signal, such as from a DC power supply, are provided on the same or different cables 1103 to the front end 803 from the back end 805. In one embodiment, a separate cable is provided for each type of signal. In an alternative embodiment, one or more cables share two or more different types of signals. The different types of signals includes the reference oscillation signal, such as 10 MHz signal, the down converted local positioning ranging signals, such as at about 1.5 Gigahertz, the power signal, and GNSS signals.

In the embodiments of FIGS. 11 and 18, a down converter is provided as a mixer 814 between the antenna 806 and any decorrelator 1108 or 818. In the analog decorrelation embodiment discussed above, the down converter is provided between the antenna 806 and the analog mixer 818. The down converter is formed by the mixer 814 and the oscillator 816. The oscillator 816 is a synthesizer, such as a voltage control oscillator or a phase lock dielectric resonator oscillator. The mixer 814 down converts the received ranging signal from the antenna 806 in response to the reference oscillation signal from the synthesizer 816. The synthesizer 816 is phase locked to the reference frequency from the reference oscillator 1106 of the back end 805 or primary receiver. The ranging signals from the antenna 806 are down converted from the X-band, ISM-band, or other high frequency band to an intermediate frequency. Any intermediate frequency band may be used, such as 1.5 gigahertz. In the embodiment of FIG. 18, analog decorrelation is performed in the front end 803 and the resulting intermediate frequency output on the cable 1103 is an even lower value, such as 175 megahertz. Separate down conversion may be performed for GNSS signals from the antenna 808. Alternatively or additionally, the GNSS or local signals are down converted in the back end 805.

The signal distribution 1102 distributes the various types of signals to the corresponding components. The signal distributors 1102 and 1104 are multiplexers, diplexers, triplexers or other devices for distributing signal information as a function of frequency, time, coding, combinations thereof or other formats. A reference frequency and power signal received from the back end 805 are distributed by the signal distribution 1102 to the synthesizer 816. The down converted ranging signals from the land-based transmitter and GNSS ranging signals are distributed from the front end 803 to the back end 805. Similarly, the signal distributor 1104 performs distribution of signals in the back end 805.

The cable 1103 connects between the down converter or the front end 803 and the rest of the receiver in the back end 805. The cable 1103 is a coaxial cable, wire, ribbon, or other conductor operable to transmit down converted signals from the front end 803 to the back end 805. The cable 1103 is also operable to transmit a reference signal from the oscillator 1106 and the back end 805 to the remotely located front end 803. A power signal is also provided over the same cable 1103. GNSS signals are provided over the same cable 1103 or a different cable. Using difference in frequencies of the signals, splitters, diplexers, biplexers, multiplexers or other devices may be used to split the desired signals in the signal distributors 1102 and 1104. For example, a signal splitter is operable to isolate the reference signal from a down converted signal. In alternative embodiments, a separate cable is provided for each of the different types of signal. In yet another alternative embodiment shown in FIG. 18, three separate cables are provided for the five different types of signals. One cable provides a generated code for demodulation. Another cable includes both power and the down converted intermediate frequency signals. The third cable includes both GNSS signals and the reference frequency signal. Other combinations of types of signals on one or more cables may be used. For example, only two cables are used where decorrelation is performed in the back end 805 as represented in FIG. 11. FIGS. 11 and 18 show two different embodiments implementing different functions in the front end 803 and the back end 805. Further digital and analog processes may be performed in the back end 805, such as down conversion in the down converters 1110 and 1112.

In one embodiment, a GPS chip set is used for the GNSS receiver portion 802. An FPGA is used to implement the digital down conversion 1110 and associated phase tracking. Addition analog down conversion may be implemented in device 1108. Any of various combinations of analog and digital processes may be implemented in the back end 805. Different combinations of analog and/or digital processes may also be implemented in the front end 803. By separating the processes between the front end and the back end, a long cable connection may be used even where high frequency ranging signals are received by the antenna 806.

For augmented positioning in a GNSS system, the different antennas are located at known positions relative to each other. For example, the local antenna 806 is positioned at a distance greater than a meter from GNSS antenna 808, but closer positions may be used. In alternative embodiments, the phase centers of both the local antenna 806 and the GNSS antenna 808 are within at most one wavelength of the GNSS signal to each other. For example, the phase centers are within ten centimeters of each other. In the antenna structures shown in FIGS. 14-16, the phase centers of the two different antennas 806, 808 are aligned along at least two axes, resulting in a substantially same position for both phase centers.

Figure 14:
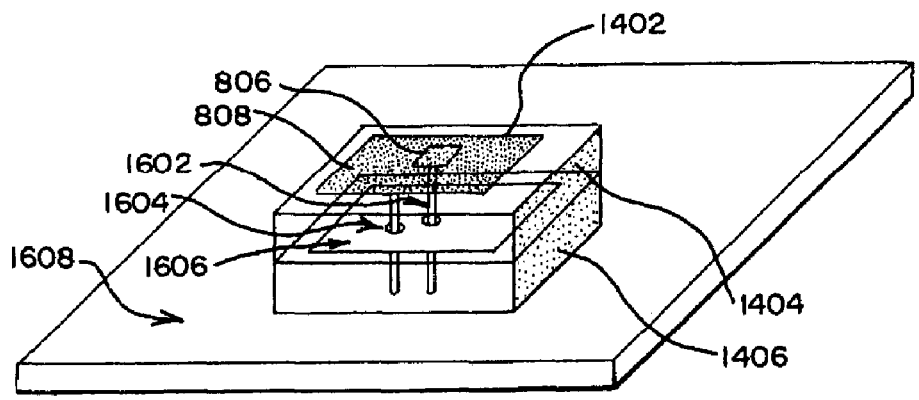
FIG. 14 is a graphical representation of an embodiment of combined GNSS and local positioning receive antennas.

Referring to FIG. 14, the GNSS antenna 808 is capable of receiving GNSS signals at one or more GNSS wavelengths, such as 19 or 24 centimeter wavelengths. In the embodiment shown in FIG. 14, the GNSS antenna 808 is a patch antenna, but other GNSS antennas may be used. An L1 antenna 808 and optionally an L2 antenna 1606 are provided for receiving GNSS signals.

The local antenna 806 receives X-band signals from different land-based transmitters. The local antenna 806 has a center axis extending through a center of the patch antennas of the GNSS antenna 808. The average phase centers of the antennas 806, 808, 1606 reside along the center axis. The phase center is within at most one wavelength of the GNSS signals from the phase center of the patch antenna 808.

FIG. 14 shows substantially co-located phase centers for GNSS antennas 806 and/or 1606 and the microwave antenna 806. The local antenna 806 is implemented as a patch antenna. For example, three patch antennas stacked on top of each other may be provided similar to the structures disclosed in U.S. Pat. No. 6,198,439, the disclosure of which is incorporated herein by reference. Rectangular or circular patches may be used. The local patch antenna 806 is positioned on the top of the GNSS antennas 808, 1606 and operates in a fundamental mode having a hemispherical radiation pattern. The feeds for the different patches 806, 808, 1606 are separated or placed on common coaxial probe feeds and split by a diplexer on the back of the antenna. FIG. 14 shows split feeds with one coaxial probe feed 1602 connected to the local antenna 806 and another probe feed 1604 connected with the GNSS antennas 808 and 1606.

Three dielectric layers 1402, 1404 and 1406 support the antennas 806, 808, 1606. The dielectric layers determine the resonant frequencies of the corresponding patches. The patches connect with the feed on a diagonal which connects to opposite corners of the rectangle. Two nearly degenerate modes are excited 90° out-of-phase to achieve Right Hand Circular Polarization (RHCP). Moving the feeds 1602, 1604 toward the center of the corresponding patch may reduce the input impedance of the feed 1602, 1604. A 50 ohm input impedance may be obtained by proper placement of the probe.

Figure 15A:
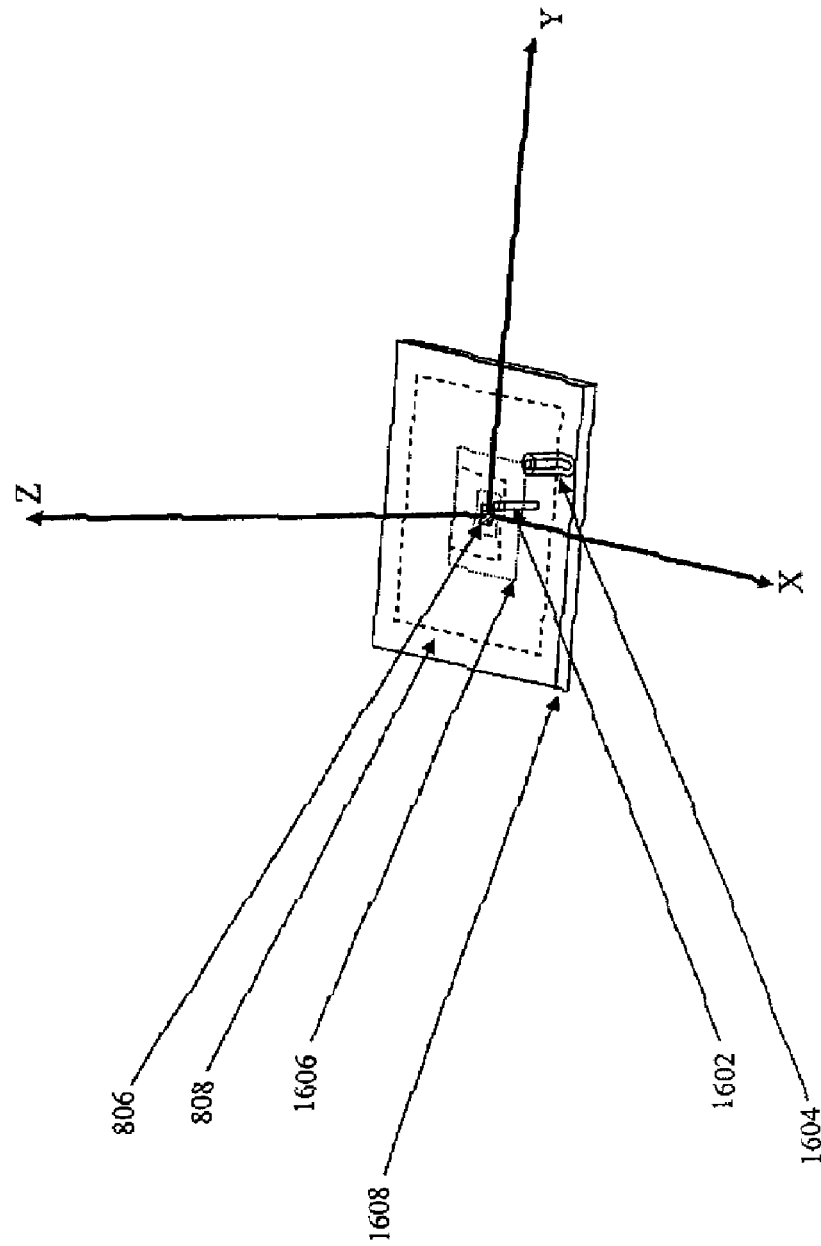
FIGS. 15A and B graphically represent another embodiment of combined GNSS and local positioning antennas.

FIGS. 15A and B show another embodiment of the local antenna 806 with a similar or substantially same phase center as the GNSS antenna 808. FIG. 15B is a cross-sectional view of the antenna structure shown in perspective view in FIG. 15A. The local antenna 806 is a patch antenna, such as an X-band patch antenna. As an alternative to the patch antenna for the GNSS signals, the GNSS antenna 808 and 1606 are ring antennas. The lower ring 1606 resonates at the L2 frequency, and the upper ring 808 resonates at the L1 frequency. In alternative embodiments, the lower ring resonates at the L1 frequency and the upper ring resonates at the L2 frequency. In yet other alternative embodiments, only an L1 or only an L2 antenna is provided. The local antenna 806 is positioned between the rings 808, 1606. The feed 1602 connects with the local antenna 806. The feed 1604 connects with the lower ring 1606. The feeds 1604, 1602 are positioned or connected at the corners of the lower ring 1606 and local antenna 806, respectively, to provide a 50 ohms matching resistance. A lower dielectric layer is positioned between the ground plane 1608 and the lower ring 1606. A middle dielectric layer is positioned between the lower ring 1606 and upper ring 808. The microwave antenna 806 is formed within the middle dielectric layer. An upper dielectric layer is positioned between the upper ring 808 and free space or other structure. The dielectric layers are sized to provide the desired resonant frequencies of the metallic structures.

Figure 16:
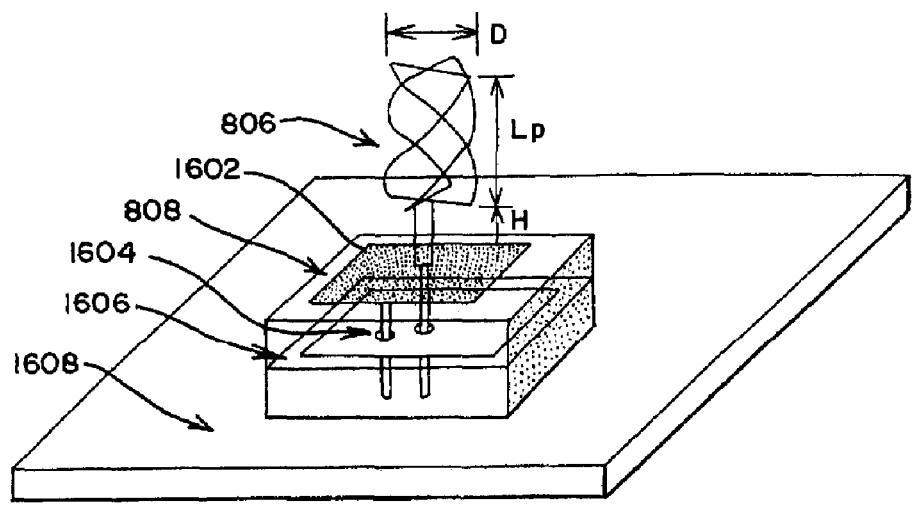
FIG. 16 is yet another embodiment of combined GNSS and local positioning antennas.

FIG. 16 shows yet another embodiment of the local antenna 806 with a similar or substantially same phase center as the GNSS antenna 808. The local antenna 806 is a microwave antenna, such as a quadrafilar helix antenna. The helix antenna is tuned to the desired frequency, such as the X-band frequency of ranging signals. In one embodiment, the helix antenna has a diameter of less than a quarter of an inch and a height of less than 0.4 inches, but other sizes may be used. The antenna is sized to receive signals out of band from the GNSS antenna 808. Loop structures are twisted along the vertical axis by one-half a turn, but a quarter turn, one-and-a-quarter turns or other number of turns may be used. The dimensions of the antenna for operation at 9,750 megahertz are LP=0.327 inches, H=0.295 inches and D=0.218 inches. The antenna 806 extends from the patch antenna 808 along at least one dimension, such as along an axis from the center of the GNSS antenna 808.

The helix antenna of the local antenna 806 connects with a feed 1602. Feeds are also provided at 1604 for the patch antenna 808. The entire antenna structure is mounted on a grounding plane 1608. The patch antenna feed 1604 is either an aperture coupled feed system or coaxial probes. As a dual patch antenna 808, 1606, two rectangular metal patches are stacked on top of each other with a common feed, such as one or two coaxial probes of the feed system 1604. The phase center is nearly co-located for the two patches and radiation patterns are nearly identical, being hemispherical and right-hand circularly polarized. To integrate the local antenna 806 onto the dual patch GNSS antenna 808, 1606, a hole is formed through the center of the dual patch antennas 808, 1606. The center corresponds to an electric field null region, so shorting the center of the patch to ground has no or limited effect. The feed 1602 is two coaxial cables through the hole. The cables carry signals to and from the microwave antenna 806 which are 90° out of phase. The phase shift is obtained by a 90° hybrid splitter etched on a printed circuit board located underneath the ground plane 1608. The 90° phased signals from the two coaxial cables are delivered to the two loop structures by a balun. The balun converts the unbalanced coaxial cable signals to balanced or differential signals suitable for driving the loop structures of the local antenna 806. To avoid having metallic conductors within the volume of the helix, the antenna is fed from the bottom.

As an alternative to implementing the helix antenna loops with wire elements, the loops may be realized by etching a copper pattern on a microwave laminate. The laminate is rolled into a cylindrical shape to achieve the desired geometry. A single feed line may pass through the center of the GNSS patches. The 90° phase shift and balun are etched on the microwave laminate along with the radiating loop elements, providing a more compact integrated antenna.

Various embodiments of ranging or positioning systems are discussed above. Corresponding methods and alternatives are also discussed above. FIG. 19 shows a flow chart of one embodiment of a method for determining the position of a receiver within a region of operation. The position is determined from a plurality of ranges from a receiver to land-based transmitters or other transmitters. The method is performed using the systems described above or different systems. Additional, different or fewer acts may be provided, such as not performing the augmentation of act 1918, or the differential positioning of act 1916, or not using one ore more of the characteristics of the transmitted ranging signal of 1906-1912. As another example, a range is determined rather than a determination of position in act 1920.

In act 1902, a ranging signal is generated from a land-based transmitter. The ranging signal is generated in response to signals from an oscillator. In one embodiment, the oscillator is unsynchronized with any remote oscillator, but may be synchronized in other embodiments. The ranging signal has a code and a carrier wave. The code is generated at a multiple of the frequency of the oscillator, such as a crystal oscillator. A dielectric resonator oscillator is phase locked to the crystal oscillator. The carrier wave is generated as a function of the frequency of the dielectric resonator oscillator. By mixing the code with the carrier wave, the ranging signal is generated. The code may be further modulated with a binary data signal. Other techniques may be used for generating a ranging signal.

In act 1904, the ranging signal with the code and carrier wave is transmitted. After amplification, the ranging signal is applied to an antenna for transmission. A ranging signal has any of the various characteristics identified in acts 1906 through 1912. For example, the ranging signal has a modulation rate of the code of greater than or equal to 30 MHz in act 1906. In one embodiment, the ranging signal has a modulation rate of the code being at least about 50 MHz. A modulation rate of at least about 150 MHz and less than 250 MHz is used in other embodiments.

In act 1908, the code has a code length in space approximately equal to a longest dimension of a region of operation of a local positioning system. For example, the region of operation in space is less than about 15 kilometers. The code length is more or less than the region of operation, such as being slightly longer than the region of operation in space.

Other code lengths may be used, such as code lengths less than 10, 5, 1 or other number of kilometers. Greater code lengths may be used, such as code lengths more than twice the longest dimension of a region of operation. Code lengths unrelated to the size of the region of operation may also be provided in alternative embodiments.

In act 1910, the transmitter ranging signals have a carrier wave in the X or ISM-band. For example, the ranging signals are transmitted as an X-band signal with about 60, 100, or up to 500 MHz of bandwidth. Greater bandwidths or lesser bandwidths may be provided. In one embodiment, the bandwidth is about twice the modulation rate of the code. For ISM-band carrier waves, the bandwidth may be less, such as 50 MHZ, 60 MHZ or less.

In act 1912, the ranging signals are transmitted in a time slot with a blanking period. Ranging signals from different land-based transmitters are transmitted sequentially in different time slots. Each time slot is associated with a blanking period, such as a subsequent time slot or a time period provided within a given time slot. The blanking period corresponds to no transmission, reduced amplitude transmission and/or transmission of noise, no code or a different type of signal. By transmitting the code division multiple access ranging signals in a time division multiple access time slots, a greater dynamic range may be provided. The blanking period is about as long as the code length. The codes from different transmitters have a substantially equal length within each of the different time slots. The corresponding blanking periods also have substantially equal length. The blanking period may have duration substantially equal to the longest code of all of the transmitted ranging signals in a temporal domain. Various time slots and associated transmitters are synchronized to within at least 3 microseconds, but greater or lesser tolerance may be provided. The synchronization for the time division multiple access prevents interference of one transmitter from another transmitter. In alternative embodiments, continuous transmission of code division multiple access signals without time division is used.

Transmission of the ranging signals from each of the different land-based transmitters is repeated at least 10 times a second or at other repetition periods. Using a number of time slots and blanking periods equal to or larger than a number of land-based transmitters allows for ranging signals for each of the land-based transmitters to be detected separately. Alternatively, a fewer number of time slots are provided than land-based transmitters. Some land-based transmitters are used for backup purposes and avoid transmission while a different transmitter is using a given time slot.

In act 1914, the local ranging signals are received at a mobile receiver. For example, code division multiple access radio frequency ranging signals in an X or ISM-band are received. Alternatively or additionally, local ranging signals in a GNSS-band are received. The X or ISM-band signals are microwave signals from a land-based transmitter. The ranging signals are received within a region of operation. The code of the ranging signals has a code length in space at least approximately equal to a longest dimension of the region of operation. For example, a code length for a 10 kilometer region of operation is between about 10 and 15 kilometers. Shorter lengths may be used.

In act 1916, the ranging signals are also received at a reference station or a second receiver spaced from the mobile receiver. The second receiver may be co-located with a land-based transmitter or spaced from all land-based transmitters. By receiving the signals at two different locations, a differential position solution may be used.

Where the ranging signals are transmitted with time division multiple access, then the spread spectrum signals are received in time slots. For example, at least four different sets of spread spectrum signals are received in a respective at least four different time slots. Each of the at least four time slots has a period less than about 0.20 milliseconds, but other time periods may be provided. The coding of the ranging signals may include both detection codes and tracking codes transmitted within a given time slot from a land-based transmitter. The receiver generates a plurality of replica spread spectrum codes corresponding to the received codes. The coding is used to identify one given transmitter from another transmitter. Alternatively, time slot assignments are used to identify one transmitter from another transmitter so that a same or different code may be used.

In act 1918, the local positioning system is augmented by receiving GNSS signals in a different frequency band. The GNSS signals may be received at one receiver or two or more receivers for differential position determination. Different antennas are used for receiving the different frequency signals. For example, one or more microstrip patch antennas are used for receiving GNSS signals. GNSS signals may be used to determine a range with sub-meter accuracy using carrier phase measurements. The augmentation allows determination of the position as a function of satellite signals as well as local positioning signals. Differential and/or RTK measurement of satellite signals may have a carrier wave based accuracy of better than 10 cm.

By using augmentation at 1918, a separate antenna is used for receiving the local positioning ranging signals. The antenna is adapted for receiving ISM-band, X-band or other microwave signals, such as by using a patch, microstrip, helix, or dipole antenna. The antennas may be offset or may be co-located. For example, the phase center of a microwave antenna is within one wavelength of the GNSS frequency from the phase center of a GNSS antenna. The antennas are operable at different frequencies, such as receiving local ranging signals at a frequency that is a higher frequency than the GNSS frequency band.

In act 1920, a position is determined as a function of ranges from a plurality of transmitters. Given the signal structure discussed above for act 1904, a range is determined as a function of a non-differential code phase measurement of the detection and tracking codes. The detection and tracking codes are either the same or different. The position may be determined within sub-meter accuracy using the local positioning system signals. The ranging signals are received at a substantially same center frequency, and the determination of position is free of required movement of the receiver. For example, the code has an accuracy of better than one meter, such as being better than about 10 cm. Having a chip width of less than 10 meters, sub-meter accuracy based on code phase measurements without carrier phase measurements is obtained with local positioning ranging signals.

For determining a more accurate range and corresponding position, a differential measurement is computed at the receiver as a function of different ranging signals from different land-based transmitters. The position is determined as a function of the differential measurements of the ranging signals between different receivers. For differential position solutions, information responsive to ranging signals received at one receiver, such as phase measurements or other temporal offset information, is communicated to another receiver.

Any combination of different ranging signals from different land-based transmitters and/or satellites may be used. For differential measurement, a position vector from a reference station to a mobile receiver is determined as a function of ranges or code phase measurements of the reference station relative to the mobile receiver to the land-based transmitters. A position is determined whether or not the mobile receiver is moving. Any combination of uses of ranging signals for determining position may be used, such as providing different position solutions based on a number of land-based transmitters and satellites in view.

In one embodiment, the position is determined in act 1920 based on synchronization between the clocks of the various land-based or satellite transmitters. Alternatively, ranging signals from different locations are received in an asynchronous system. Code phases and corresponding oscillators or clocks for generating the ranging signals are free of synchronization between ranging signals. The ranging signals from the plurality of transmitters are received on corresponding communications paths by a reference receiver. The communications paths correspond to X or ISM-bands for the local positioning system. A reference receiver determines a temporal offset of each of the code phases from the various transmitters. The temporal offsets are measured as phases relative to a clock of the reference receiver or relative to a phase of one of the ranging signals. The time offset information is then generated and output on a wireless communications transmitter at a different frequency band than the frequency of the ranging signals.

In one embodiment, the temporal offset information is transmitted using a wireless communication device in broadcast or direct fashion to one or more mobile receivers. In another embodiment, the temporal offset information is transmitted back to one or more of the land-based transmitters. Subsequent ranging signals transmitted from the transmitters are responsive to the temporal offset information. A different communications path than provided for the ranging signals is used to receive the temporal off-sets, such as a wireless non-ranging communications path. Frequencies other than the X-band and/or ISM-band are used. Alternatively, a same communications path is used.

The temporal offset information is received at one or more of the transmitters. The temporal offset information is provided to a mobile receiver at the same carrier frequency as the ranging signals. For example, the temporal offset is transmitted as data with the ranging signals. The ranging signal is modulated by the temporal offset or a particular code is used to reflect the temporal offset. Without communication directly with the reference receiver, the mobile receiver is able to calculate differential phase information for ranging signals. A mobile receiver may alternatively or additionally be free of communications with the transmitter other than the ranging signal modulated by the timing offset information. One transmitter may transmit offset information for ranging signals from the same transmitter, from different transmitters or combinations thereof. The transmitted timing offset information indicates the relationship of the ranging signals to a common clock source, such as the reference receiver or an arbitrarily designated master transmitter. The temporal off-sets of the ranging signals from various transmitters are all referred to the common clock source, providing synchronization in an asynchronous system.

Modulated ranging signals are received at the mobile receiver free of communications with transmitters other than the ranging signals. The ranging signals and timing offset information for differential position determination are provided in a same communications path. The position of the mobile receiver is then determined as a function of the ranging signals from a plurality of different transmitters and the corresponding temporal offset information measured at a reference receiver.

FIG. 20 shows one method for determining the position of the land-based transmitter. Different, additional or fewer acts may be provided in other embodiments. As an alternative to the method shown in FIG. 20, a survey is performed to identify the location of the land-based transmitter. In act 2002, GNSS signals are received at a local positioning system transmitter. The positions of one or more receive antennas is determined. The receive antennas are connected with a transmitter support structure. The position or location of the transmitter relative to the receive antennas is determined as a function of the measured position of the receive antennas. The position of the receive antennas is determined from GNSS signals, but laser or other measurements and corresponding signals may be used to determine the position of the receive antennas.

By providing a rigid support carrying the receive antennas and the transmitter, the position of the transmitter is determined. The phase center of the transmitter is aligned along an axis extending between or from the phase centers of one receive antenna to the phase center of another antenna. The transmitter is situated at the center of the axis between the receive antennas. Alternatively, the transmitter is offset by a known amount from or along an axis extending between any two receivers. The position of the transmitter is then determined as a function of the position of the receive antennas in act 2004.

FIG. 21 shows one embodiment of a method for determining position from received ranging signals. Additional, different or fewer acts may be provided. In act 2102, spread spectrum X or ISM-band signals are decorrelated in the analog domain. Different codes corresponding to different time slots are decorrelated with a same decorrelator. The codes correspond to a same or different transmitter. A single analog channel may be used for decorrelating signals from a plurality of transmitters.

The decorrelated signals are then converted into digital signals. A range is determined as a function of the decorrelated signals. A digital channel is used to track a code for determining the range. Decorrelation is performed in response to a one-way communication of spread spectrum X-band ranging signals in one embodiment.

In act 2104, ranging signals from a different source, such as a GNSS ranging signals, are also decorrelated for use in determining the position from two distinct ranging methods. The ranging signals are a direct sequence, spread spectrum signals. The GNSS signals are decorrelated in a digital domain.

A replica code is mixed with the signals after converting the signals from an analog-to-digital domain. A range is measured from the mixed GNSS signals. For example, one or more ranges are determined from global positioning system, GLONASS or a Galileo system. Either the code, carrier or both code and carrier phase of any number of frequencies of the GNSS signals are used to determine the range.

In act 2106, the range is determined as a function of both the local positioning ranging signals and the GNSS ranging signals. Using at least five satellites and corresponding ranging signals, a carrier phase of the GNSS signals may provide for a real time kinematic solution for position. Code phase from the local positioning system may allow for determination of a position from four or more transmitters.

The local code phase range accuracy is better than one wavelength of a carrier of a GNSS signals. For example, the wavelength of the carrier of the GNSS signals is greater than 12 cm and the code phase accuracy of the local positioning ranging signals is better than 12 cm. The code accuracy is provided by having a modulation rate of the local positioning ranging signals greater than GNSS ranging signals, such as a modulation rate at least three times the modulation rate of the GNSS signals. FIG. 13 shows one embodiment of the determination of position from ranges using two different methodologies. In alternative embodiments, different position solutions are used.

FIG. 22 shows a method for determining the position with distributed receiver components. For example, FIG. 22 shows a method for determining ranging information from global or local radio frequency ranging signals using a separated down converter from the other portions of the receiver. The separated down conversion is performed prior to or after decorrelation. The received ranging signals are down converted to an intermediate frequency as a function of a reference frequency in act 2202. The reference frequency is output from a back-end of the receiver and transmitted to the down converter along a communications path in act 2204. For example, the reference frequency is transmitted over a cable. The same cable may be used for transmitting the down converted intermediate frequency ranging signals. A signal splitter isolates the reference signal from the down converted signal for down converting.

In act 2204, a remote down converter is powered from the primary receiver. A DC power signal is provided from the primary receiver to the remote down converter. The power is used for implementing the down conversion.

The down converted intermediate frequency signals are transmitted to the remote portions of the receiver. In one embodiment, the receiver is separated from the down converter by a meter or more of distance. The down converted signals are transmitted through a coaxial cable, but other cables may be used.

In act 2204, two or more of the reference frequency, power signal and intermediate frequency ranging signals are provided on a same signal line, such as on a same cable or communications path. A plurality of communications paths and corresponding cables may be provided where one or more of the cables include two different signals. The different signals are provided at different frequencies, such as an intermediate frequency different than the power or a reference signal.

In act 2206, ranging information is determined from the transmitted down converted signals. The portion of the receiver that supplies the reference frequency and power to the down converter also performs position determination. The back-end portion of the receiver may further down-convert and/or decorrelate signals with separate channels for each of the ranging signals, such as ranging signals received in different time slots. The code phase of the decorrelated signals is then measured for determining position information.

Ranging signals from a GNSS system may also share a same or a plurality of cables with any of the intermediate frequency local positioning ranging signals, power signals and/or reference signals. The position may be determined as a function of both signals from the GNSS ranging and local positioning system ranging.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for determining a position of a receiver from transmitted signals, the method comprising:
    (a) measuring at least a first range from first signals for a global navigation satellite system;
    (b) measuring at least a second range from second signals for a local positioning system; and
    (c) determining the position of the receiver from the measurements of (a) and (b);
    wherein the measurements of the second signals for the local positioning system have a code phase range accuracy better than one wavelength of a carrier of the first signals from the global navigation satellite system;
    wherein (a) comprises measuring from the first signals, the first signals having a carrier with a wavelength greater than 15 cm, and wherein (b) comprises measuring from the second signals, the measurements of the second signals have better than 2 cm code phase range accuracy.

2. The method of claim 1 wherein (a) comprises measuring from the first signals for one of: the Global Positioning System, GLONASS, Galileo or combinations thereof.

3. The method of claim 1 further comprising:
    (d) digital de-correlating the first signals prior to (a), the first signals being first direct-sequence, spread spectrum signals; and
    (e) analog de-correlating the second signals prior to (b), the second signals being second direct-sequence, spread spectrum signals.

4. The method of claim 1 wherein the second signals have a second code modulation rate at least ten times a first code modulation rate of the first signals.

5. The method of claim 1 wherein (a) comprises measuring a carrier phase of the first signals from at least five satellites, and wherein (c) comprises performing a real-time kinematic measurement as a function of the carrier phases of the first signals.

6. The method of claim 1 wherein (a) comprises measuring the first signals from at least one and fewer than four satellites, wherein (b) comprises measuring the second signals from only one land based transmitter, and wherein (c) comprises determining the position with a first accuracy more accurate than a second accuracy determined from a differential global navigation system solution, using only satellites, with a similar dilution of precision.

7. The method of claim 1 wherein (a) comprises measuring the first signals from at least two and fewer than five satellites, wherein (b) comprises measuring the second signals from at least one land based transmitter, a total number of the at least two satellites and at least one land based transmitter being at least five and wherein (c) comprises performing a real-time kinematic measurement as a function of the carrier phases of the first signals augmented with the measurements of (b).

8. The method of claim 1 wherein (b) comprises measuring a code phase of the second signals from at least four land based transmitters;
    further comprising:
    (d) determining a position estimate as a function of the code phases of the second signals; and (e) determining integer ambiguity of carrier phase of the first signals as a function of the position estimate;
wherein (c) comprises refining the position estimate as a function of the first signals and the determination of the integer ambiguity, a dilution of precision of the position being based on the at least four land based transmitters and at least one satellite.

9. The method of claim 1 wherein (a) comprises measuring a third range for a global navigation system; and (b) comprises measuring a code phase of the second signals from at least four land based transmitters;
further comprising:
(d) determining a position estimate as a function of the code phases of the second signals; and
(e) determining integer ambiguity of carrier phase of the first signals as a function of the position estimate;
wherein (c) comprises refining the position estimate as a function of the first signals and the determination of the integer ambiguity.

10. A method for determining a position of a receiver from transmitted signals, the method comprising:
(a) measuring at least a first range from first signals for a global navigation satellite system;
(b) measuring at least a second range from second signals for a local positioning system; and
(c) determining the position of the receiver from the measurements of (a) and (b);
wherein the measurements of the second signals for the local positioning system have a code phase range accuracy better than one wavelength of a carrier of the first signals from the global navigation satellite system;
wherein (b) comprises measuring from the second signals with a modulation rate of a code being at least 30 MHz carried in the X-band, ISM band or combinations thereof.

11. A system for determining a position of a receiver from transmitted signals, the system comprising:
a global navigation satellite system receiver operable to measure at least a first range from first signals from at least a first satellite;
a local positioning system receiver operable to measure at least a second range from second signals from at least a first land based transmitter, wherein the second signals for the local positioning system have a code phase range accuracy better than one wavelength of a carrier of the first signals from the global navigation satellite system; and
a processor operable to determine the position of the receiver from the measurements of the global navigation satellite system receiver and the local positioning system receiver;
wherein the first signals have a carrier with a wavelength greater than 15 cm, and the second signals have better than 2 cm code phase range accuracy.

12. The system of claim 11 wherein the global navigation satellite system receiver comprises:
a first analog-to-digital converter;
a first code generator; and
a digital mixer operable to mix a first code output by the first code generator with the first signals output by the first analog-to-digital converter;
wherein the local positioning system receiver comprises:
a second code generator;
an analog mixer operable to mix a second code output by the second code generator with the second signals; and
a second analog-to-digital converter operable to convert the mixed second code and second signals from analog to digital.

13. The system of claim 11 wherein the second signals have a second code modulation rate at least ten times a first code modulation rate of the first signals.

14. The system of claim 11 wherein the global navigation satellite system receiver is operable to measure a carrier phase of the first signals from at least five satellites, and the processor is operable to perform a real-time kinematic measurement as a function of the carrier phases of the first signals.

15. The system of claim 11 wherein the global navigation satellite system receiver is operable to measure the first signals from at least one and fewer than four satellites, wherein the local positioning system receiver is operable to measure the second signals from only one land based transmitter, and wherein the processor is operable to determine the position with a first accuracy more accurate than a second accuracy determined from a differential global navigation system solution, using only satellites, with a similar dilution of precision.

16. The system of claim 11 wherein the global navigation satellite system receiver is operable to measure the first signals from at least two and fewer than five satellites, wherein the local positioning system receiver is operable to measure the second signals from the at least first land based transmitter, a total number of the at least two satellites and the at least first land based transmitter being at least five and wherein the processor is operable to perform a real-time kinematic measurement as a function of the carrier phases of the first signals augmented with the measurements of the second signals.

17. The system of claim 11 wherein the local positioning system receiver is operable to measure a code phase of the second signals from at least four land based transmitters including the first land based transmitter; and
wherein the processor is operable to determine a position estimate as a function of the code phases of the second signals, operable to determine an integer ambiguity of carrier phase of the first signals as a function of the position estimate, and is operable to refine the position estimate as a function of the first signals and the determination of the integer ambiguity, a dilution of precision of the position being based on the at least four land based transmitters and at least one satellite.

18. The system of claim 11 wherein the local positioning system receiver is operable to measure a code phase of the second signals from at least four land based transmitters including the first land based transmitter; and
wherein the processor is operable to determine a position estimate as a function of the code phases of the second signals, operable to determine an integer ambiguity of carrier phase of the first signals as a function of the position estimate, and is operable to refine the position estimate as a function of the first signals and the determination of the integer ambiguity.

19. A system for determining a position of a receiver from transmitted signals, the system comprising:
a global navigation satellite system receiver operable to measure at least a first range from first signals from at least a first satellite;
a local positioning system receiver operable to measure at least a second range from second signals from at least a first land based transmitter, wherein the second signals for the local positioning system have a code phase range accuracy better than one wavelength of a carrier of the first signals from the global navigation satellite system; and
a processor operable to determine the position of the receiver from the measurements of the global navigation satellite system receiver and the local positioning system receiver;
wherein the second signals have a modulation rate of a code being at least 30 MHz carried in the X-band, ISM band or combinations thereof.

* * * * *